(12) United States Patent
Shakes et al.

(10) Patent No.: US 10,083,478 B2
(45) Date of Patent: Sep. 25, 2018

(54) SYSTEM AND METHOD FOR VISUAL VERIFICATION OF ORDER PROCESSING

(71) Applicant: Amazon Technologies, Inc., Reno, NV (US)

(72) Inventors: Jonathan J. Shakes, Mercer Island, WA (US); Francois M. Rouaix, Seattle, WA (US); Donald L. Kaufman, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 588 days.

(21) Appl. No.: 14/685,020

(22) Filed: Apr. 13, 2015

(65) Prior Publication Data
US 2015/0221021 A1    Aug. 6, 2015

Related U.S. Application Data

(63) Continuation of application No. 14/229,575, filed on Mar. 28, 2014, now Pat. No. 9,626,712, which is a
(Continued)

(51) Int. Cl.
*G06Q 10/08* (2012.01)
*G06Q 30/06* (2012.01)
(Continued)

(52) U.S. Cl.
CPC ........... *G06Q 30/0635* (2013.01); *G06K 9/78* (2013.01); *G06Q 10/06395* (2013.01);
(Continued)

(58) Field of Classification Search
CPC ............ G06Q 10/083; G06Q 10/0832; G06Q 10/0833; G06Q 10/075; G06Q 30/0601; G06Q 30/0643
(Continued)

(56) References Cited

U.S. PATENT DOCUMENTS

| 3,849,967 A | 11/1974 | Angermeier et al. |
| 4,462,045 A | 7/1984 | Norris |

(Continued)

FOREIGN PATENT DOCUMENTS

| EP | 1160703 | 12/2001 |
| JP | 200424696 | 9/2004 |

OTHER PUBLICATIONS

Chiranky, L., "Customer Advocacy Paradigm: The Bonnie Button and Beyond," Telemarketing and Call Center Solutions, vol. 15, No. 7, p. 98, Jan. 1997.*

(Continued)

*Primary Examiner* — Nicholas D Rosen
(74) *Attorney, Agent, or Firm* — Robert C. Kowert; Meyertons, Hood, Kivlin, Kowert & Goetzel, P.C.

(57) ABSTRACT

One or more images of items for an order being processed at processing station of an order fulfillment center may be captured and associated with the order. Alternatively, a short video clip may be captured of the order being packaged. An electronic notification that the order has been processed may be sent to a customer associated with the order. The electronic notification may include a reference to one or more of the captured images or video clips. The customer may use a reference included in the notification to view the captured images. The customer may view captured images to verify that the order has been correctly processed. The captured images may include images of the items being packaged for shipment and may show the shipping address on the package allowing the customer to verify that indeed it is his package in the images.

20 Claims, 17 Drawing Sheets

Related U.S. Application Data continuation of application No. 12/705,476, filed on Feb. 12, 2010, now Pat. No. 8,688,598, which is a continuation of application No. 11/076,842, filed on Mar. 10, 2005, now Pat. No. 7,689,465.

(51) Int. Cl.
  *G06Q 99/00* (2006.01)
  *G06K 9/78* (2006.01)
  *G06Q 10/06* (2012.01)

(52) U.S. Cl.
  CPC ......... *G06Q 10/08* (2013.01); *G06Q 10/0832* (2013.01); *G06Q 30/0641* (2013.01); *G06Q 99/00* (2013.01); *G06Q 10/083* (2013.01); *G06Q 10/0833* (2013.01); *G06Q 10/0875* (2013.01); *G06Q 30/0643* (2013.01)

(58) Field of Classification Search
  USPC ................ 705/26.1, 27.2, 29, 332, 333, 330
  See application file for complete search history.

(56) References Cited

U.S. PATENT DOCUMENTS

| | | | |
|---|---|---|---|
| 4,518,302 | A | 5/1985 | Knapp |
| 5,619,587 | A | 4/1997 | Willoughby et al. |
| 5,737,491 | A | 4/1998 | Allen et al. |
| 5,815,911 | A | 10/1998 | Hase et al. |
| 5,917,542 | A | 6/1999 | Moghadam et al. |
| 6,003,015 | A * | 12/1999 | Kang ............... G06Q 10/087 312/100 |
| 6,133,985 | A | 10/2000 | Garfinkle et al. |
| 6,260,495 | B1 | 7/2001 | Stewart et al. |
| 6,393,408 | B1 | 5/2002 | Mosher et al. |
| 6,505,461 | B1 | 1/2003 | Yasunaga |
| 6,560,281 | B1 | 5/2003 | Black et al. |
| 6,622,127 | B1 | 9/2003 | Klots et al. |
| 6,950,198 | B1 | 9/2005 | Berarducci et al. |
| 6,957,186 | B1 | 10/2005 | Guheen et al. |
| 7,020,584 | B2 * | 3/2006 | Takaoka ............... G06Q 10/06 702/182 |
| 7,028,723 | B1 | 4/2006 | Alouani et al. |
| 7,133,851 | B1 | 11/2006 | Benson |
| 7,177,825 | B1 | 2/2007 | Borders |
| 7,190,895 | B1 | 3/2007 | Groves et al. |
| 7,191,942 | B2 | 3/2007 | Aptekar |
| 7,266,522 | B2 | 9/2007 | Dutta et al. |
| 7,596,260 | B2 | 9/2009 | Tedesco et al. |
| 7,686,171 | B1 | 3/2010 | Shakes et al. |
| 7,689,465 | B1 | 3/2010 | Shakes et al. |
| 7,769,221 | B1 | 8/2010 | Shakes et al. |
| 7,844,468 | B2 | 11/2010 | Lahiri |
| 8,032,249 | B1 | 10/2011 | Shakes et al. |
| 8,301,294 | B1 | 10/2012 | Shakes et al. |
| 8,417,599 | B2 * | 4/2013 | Wirth, Jr. ............... G06Q 30/02 386/225 |
| 8,433,437 | B1 | 4/2013 | Shakes et al. |
| 8,688,598 | B1 * | 4/2014 | Shakes ................ G06Q 10/08 705/29 |
| 9,626,712 | B1 * | 4/2017 | Shakes ................ G06Q 10/08 |
| 2001/0016059 | A1 | 8/2001 | Krahn et al. |
| 2001/0043269 | A1 | 11/2001 | Holloway |
| 2002/0040333 | A1 | 4/2002 | Fuwa |
| 2002/0040564 | A1 | 4/2002 | Killingbeck et al. |
| 2002/0109863 | A1 | 8/2002 | Monroe |
| 2002/0184640 | A1 | 12/2002 | Schnee et al. |
| 2003/0042304 | A1 | 3/2003 | Knowles et al. |
| 2003/0110098 | A1 * | 6/2003 | Wirth, Jr. ............... G06Q 30/02 705/26.62 |
| 2003/0110100 | A1 * | 6/2003 | Wirth, Jr. ............... G06Q 30/02 705/27.2 |
| 2003/0120369 | A1 | 6/2003 | Takaoka et al. |
| 2003/0160097 | A1 | 8/2003 | Steiner |
| 2003/0222091 | A1 | 12/2003 | Gerold et al. |
| 2004/0149823 | A1 | 8/2004 | Aptekar |
| 2004/0220818 | A1 | 11/2004 | Lahiri |
| 2004/0243452 | A1 * | 12/2004 | Barton ................ G06Q 10/08 705/337 |
| 2004/0263333 | A1 | 12/2004 | Romeres |
| 2005/0049927 | A1 | 3/2005 | Zelanis et al. |
| 2005/0075989 | A1 | 4/2005 | Biasi et al. |
| 2005/0102976 | A1 | 5/2005 | Stroup |
| 2005/0107903 | A1 | 5/2005 | Kanazawa et al. |
| 2005/0116033 | A1 | 6/2005 | Moore |
| 2005/0177441 | A1 | 8/2005 | Bryant |
| 2006/0136236 | A1 | 6/2006 | Horton |
| 2007/0169838 | A1 | 7/2007 | Yuyama et al. |
| 2007/0214065 | A1 | 9/2007 | Kahlon et al. |
| 2008/0052881 | A1 | 3/2008 | Oertel |

OTHER PUBLICATIONS

Silvey, L., "eForum: Technology Works When Properly Applied," Aftermarket Business, p. 14, Sep. 2003.*

Mintcloud, B., "Money-Making Ideas for the Profit-Minded Supervisor," Supervision vol. 55, No. 10, pp. 22-23, Oct. 1994.

Dunn, K., "Tainted Gems Lose Sparkle as Prices Fall," Christian Science Monitor, World section, p. 1, Oct. 27, 2000.

U.S. Appl. No. 11/077,431, filed Mar. 10, 2005, Jonathan J. Shakes.

Anon., "Smith & Wesson Tactical Watch Line Now with Tritium; Safe New Technology Glows in the Dark for 25 Years," Business Wire, 1 page, Dec. 8, 2004.

U.S. Appl. No. 11/076,842, filed Mar. 10, 2005, Jonathan J. Shakes.
U.S. Appl. No. 12/705,476, filed Feb. 12, 2010, Jonathan J. Shakes.

* cited by examiner

SYSTEM AND METHOD FOR VISUAL VERIFICATION OF ORDER PROCESSING

This application is a continuation of U.S. application Ser. No. 14/229,575 now U.S. Pat. No. 9,626,712, filed Mar. 28, 2014, which is a continuation of U.S. application Ser. No. 12/705,476, filed Feb. 12, 2010, now U.S. Pat. No. 8,688,598, which is a continuation of U.S. application Ser. No. 11/076,842, filed on Mar. 10, 2005, now U.S. Pat. No. 7,689,465, all of which are incorporated by reference herein in their entireties.

BACKGROUND OF THE INVENTION

Field of the Invention

This invention relates to materials handling systems such as order processing systems and, more particularly, to visual verification of order processing in materials handling facilities.

Description of the Related Art

The increasing scope of electronic commerce, fueled by the ubiquity of personal computers, the Internet, and the World Wide Web, has resulted in striking changes to the number of options open to customers to shop and pay for products. Virtual storefronts allow customers to view product information including features, specifications, appearance, pricing and availability from their own homes or offices. Such virtual storefronts have become commonplace even among wholesalers and retailers who may still maintain physical customer presences (i.e., brick-and-mortar storefronts). Many companies conduct business exclusively through virtual storefronts without maintaining any other form of customer presence, such as a physical storefront. Electronic commerce using virtual storefronts offers many advantages, such as lower cost overhead (e.g., due to lack of sales personnel, lack of physical storefronts, highly automated ordering processes, etc.), and a potential customer base limited only by the reach of the Internet.

Retailers, wholesalers, and other product distributors (which may collectively be referred to as distributors) typically maintain an inventory of items that may be ordered by clients or customers. This inventory may be maintained and processed at an order fulfillment center which may include, but is not limited to, one or more of: warehouses, distribution centers, cross-docking facilities, packaging facilities, shipping facilities, or other facilities or combinations of facilities for performing one or more functions of materials (e.g., inventory) handling. An order fulfillment center may also process and ship orders for one or more merchants.

Traditionally the first notification a customer received after placing an order was when the order arrived. With the increasing use of email, some merchants send email messages informing customers that their orders have shipped. Frequently, however, these notification emails are sent automatically by a computer system in response to the customer placing an order and do not actually correspond to the processing or shipping of the order. A common scenario is for a customer to place an order, receive an email saying that the order has been shipped (or will be shipped shortly), only to later learn of a problem preventing the order from shipping, such as an item not currently in stock. Sometimes an order may arrive, but one or more items of the order could not be shipped at the same time and are therefore missing from the shipment. Often the customer receives an automatic notification email very quickly after placing an order, but only learns of problems with the order days later, frequently via regular mail. Also, such notification emails typically do not provide any means for a customer to verify that his order is truly on it way. Nor do such notification emails typically convey any means for a customer to verify that his order includes the correct items, was properly addressed, or that items are shipped in the proper condition, etc. Merchants may include a carrier or shipping tracking ID in notification emails, which helps reassure customers that some package is on the way, but does not indicate what is being shipped. Additionally, not all shipping methods provide tracking IDs. Thus, notification messages often do little to instill confidence within customers that their orders were properly processed and shipped. Consequently, customers increasingly have little or no confidence in such notification emails.

Merchants may also include flyers or other advertisements, frequently for third parties, when packing and shipping orders. Generally, third parties can only verify that such advertisements are correctly included with orders by making random inspections of order processing locations. Additionally, merchants traditionally have difficulty verifying customer complaints regarding the processing and shipping of orders. Customers may complain of missing or damaged items and the merchant or supplier generally must take the customer's word regarding what items where included in an order and how those items where packaged. Additionally, merchants generally have difficulty determining whether damage to an item resulted from a packing or shipping problem.

SUMMARY

A customer may place an order for one or more items and an order fulfillment center may process and ship the order. Verification information regarding the order, such as one or more images of the order being processed, may be captured and sent, or otherwise made available, to the customer with an electronic notification that the order has been processed, packaged, and/or shipped. Alternatively, in some embodiments, one or more video clips may be used instead of, or in addition, still captured images of an order being processed, packaged, and/or shipped. For example, an online merchant may send an email message informing a customer that his order has been processed and is currently being shipped. The merchant may include in the email message a hyper-link, URI, or URL to a page on the merchant's website that allows the customer to view a short video clip showing the items of the customer's order being packaged and shipped. The customer may access the video or other images to see his order being processed and may verify that the correct items are in the order. In some embodiments, the customer may be able to see his own name and shipping address being put on the order. In other words, the customer may be able to the see his order before receiving it.

The electronic notification may, in one embodiment, include one or more captured images of an order being processed. In another embodiment, however, a reference or link, such as a URL, to the captured images may be included in the notification message. The customer may then use the included reference to view the captured images to verify that the order has been processed. For example, the captured images may include images of the items being packaged and may show the customer's name and shipping address on the package, allowing the customer to verify that the images are indeed captured images of his package being processed, and not just a stock images showing a sample package. In some embodiments, the customer may receive an electronic notification, such as an email message or "instant message", including images of his order being processing within hours of placing the order. Thus, the customer may obtain complete confidence that the order has been processed correctly and/or shipped in a timely fashion. Additionally, the images may include views of the actual items being packaged and the customer may be able to verify that the correct items were properly packaged for the order.

The captured images may include views of one or more ordered items being packaged and may also include images of packing materials, collateral materials, and other items also being put into the package. Additionally, captured images, whether video or still, may include the package being sealed, addressed, weighed, and placed on a delivery vehicle. A customer may be able to see his own name and shipping address on the package. In certain embodiments, the images may also include views of the personnel processing or packing the order. Customers receiving an electronic notification including the images (or a link to the images) showing their respective orders being processed and/or shipped may have a much higher confidence level that their respective orders were properly processed and shipped. In some embodiments, a notification messages may also include an updated delivery schedule based on the processing of the order.

Figure 1:
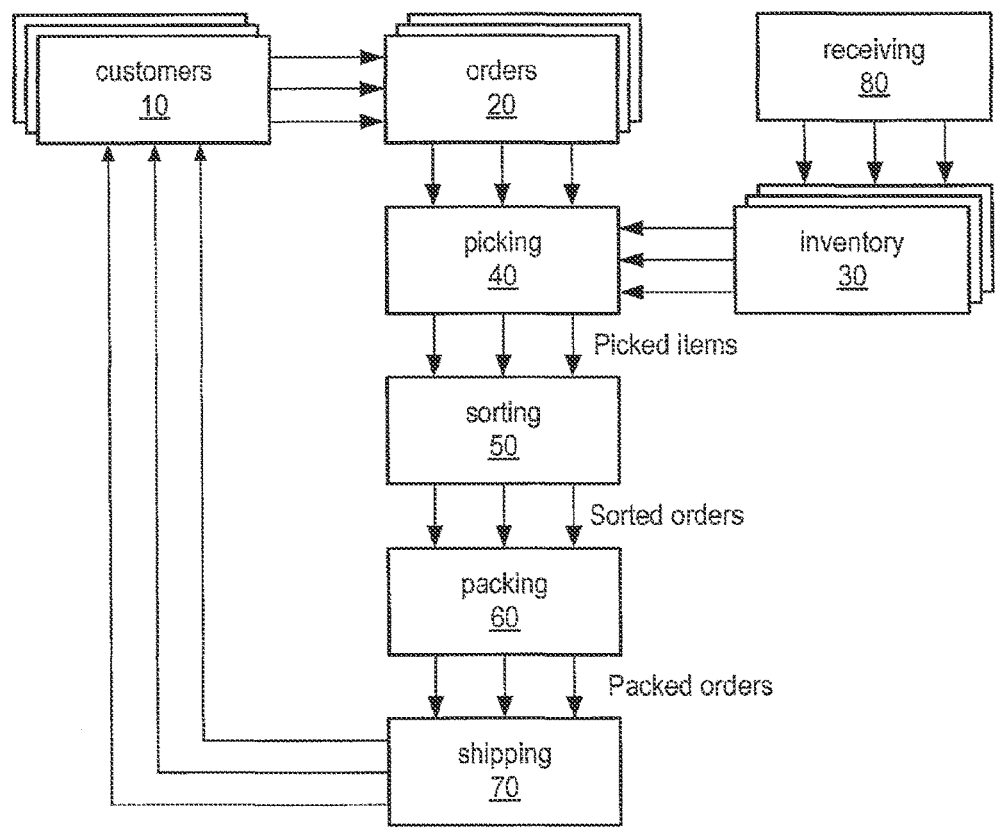
FIG. 1 illustrates a broad view of the operation of an order fulfillment center, in one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various types of information regarding the processing of an item or order may be captured or collected to provide verification of item processing or order processing, as described herein. For instance, images of an order being processed and/or shipped at an order fulfillment center may be captured and used to provide visual verification that the order was processed correctly. In various embodiments, various types of data characteristic of a process or process portion may be captured to provide additional verification of item processing or order processing. Other product specific information, such as product IDs, serial numbers, etc. may also be captured or correlated with the verification data. Verification data may be collected at various stages of order processing, such as receiving, inventory, picking, sorting, packing, value-added services, shipping, return processing, quality assurance, and/or quality control, according to various embodiments.

Verification data may be captured or collected in any of numerous manners. For instance, in one embodiment, image-capture devices, such as digital cameras, may be configured to automatically capture images of an order being processed at an order fulfillment center. Other data-capture or data collection devices, such as scales, microphones, electronic identification devices, thermometers, hydrometers, and/or other devices, may collect data regarding the processing of items or order, in some embodiments. Different data captured devices may be used to capture data in different stages of item or order processing. For example, cameras may be used to capture images of the sorting, packing and shipping of an item, in one embodiment. In another embodiment, a thermometer may capture temperature data for refrigerated storage of perishable items. In yet another embodiment, an electronic scale may capture the weight of a package being shipped.

In order to allow a customer or other interested party, such as a shipping company or vendor, to verify the proper handling or processing of items, captured verification data may be included in, or referenced by, notifications generated and sent to a customer or other interested party. For instance, a customer may receive an email including captured images showing the processing of an order. Thus, the customer may be able to verify, before actual receiving an item, that the item was properly handled and processed, according to some embodiments. Visual verification notification may take various forms, in different embodiments, such as email messages, "instant" messages, automated fax messages, cell phone pictures, etc.

FIG. 1 illustrates a broad, exemplary view of an order fulfillment center configured to employ visual verification for order processing, such as during order fulfillment, return processing, quality assurance, and/or quality control processes, as described herein. For instance, multiple customers 10 may submit orders 20 to a merchant, where each order 120 specifies one or more items from inventory 30 to be shipped to the customer that submitted the order. To fulfill the customer orders 20, the one or more items specified in each order may be retrieved or "picked" from inventory 30 (which may also be referred to as stock storage) in the order fulfillment facility, as indicated by block 40. Picked items may be delivered to one or more processing stations in the order fulfillment facility for sorting 50 into their respective orders, packing 60, and finally shipping 70 to customers 10.

In some embodiments, visual verification of the processing of an order may be provided to one or more interested parties, such as the customer. Such visual verification may include capturing data at various stages of the order processing. Various forms of data may be captured, such as images of an order being processed or other data characteristic of a particular stage of order processing. For example, visual verification of an order being processed may include captured images of order processing personnel packing ordered items for shipment. Data captured for visual verification may include environmental data, such as temperature or humidity, that may indicate proper storage of perishable items, in some embodiments. Visual verification notifications including captured data may be sent to interested parties, such as quality assurance personnel, customers, third party vendors, etc. For instance, in some embodiment, a customer 10 may receive an electronic notification, such as an email message, "instant" message, automated telephone or fax message, cellular phone picture, or text message, including information regarding the processing of an order. Such an electronic notification may include or reference captured data, such as one or more still images, video clips, and/or audio clips, of the order being processed and/or being shipped.

In other embodiments, the order fulfillment center may fulfill orders for one or more affiliated merchants and captured images of order processing may be provided to the affiliated merchants via direct electronic notification or via a web services interface to a network accessible server. Such affiliated merchants may provide the captured images or other visual verification data regarding order processing to their customers. Alternatively, the order fulfillment center may send electronic notification messages including or referencing visual verification data to customers on behalf of affiliated merchants.

For example, in one embodiment, the customer may receive (or be given access to) one or more video clips including short segments showing the customer's order being processed. Alternatively, the customer may receive one or more still images, each showing an aspect of order processing, such as picking an individual item out of inventory, packing items into a package or shipping box, weighing the package, addressing the package, and/or loading the package onto a delivery vehicle. In some embodiments, captured images may include views of one or more processing agents, such as employees of the order fulfillment center, processing an order. In other embodiments, only a portion of a processing agent may be viewable in captured images, such as the hands of an agent placing an item in a shipping carton. Thus, captured images may include some or all of one or more processing agents performing various tasks related to order processing. Additionally, other visual verification data regarding an order may be included with captured images made available for visual verification of a processed order.

Allowing a customer to view images of his order being packed and shipped, may give that customer increased confidence that his order has indeed been properly processed and/or shipped. As is understood in the art, the style of the images and video may vary from embodiment to embodiment. For example, in one embodiment, simple, low-resolution still images may be captured of order processing, while, in other embodiments, higher production quality video may be captured. In some embodiments, captured images may show the actual order processing in progress exactly as it is performed. In other embodiments, however, images may be captured showing an order in various stages of order processing. In one embodiment, processing agents may pause in performing the order processing to arrange the order for better appearance in captured images and part or all of a processing agent may also appear in captured images. For example, a quality assurance agent may appear in a captured video clip holding a processed order and smiling while giving a "thumb's up" to the camera.

When discussing capturing images for visual verification of order processing herein, the terms "images" and "captured images" refer to both still and video images and, in general, visual verification of order processing may be utilized using still images, video clips, audio, and/or any combination of still images, video images, audio and/or other forms of verification data.

In some embodiments, images may only be captured for certain orders. For example, visual verification of order processing may only be available to customers with a premium or preferred status. Alternatively, visual verification of order processing might be available when customers order faster, or premium shipping methods, but may not be generally available for standard shipping. For example, a preferred customer may place an important order before leaving work and receive an email at home later that evening showing the order being properly packaged and shipped. In certain embodiments, visual verification of order processing may provide customers with a confirmation that fragile items were carefully handled during processing and shipment. In other embodiments, captured images may be provided for every customer. In some embodiments, visual verification of order processing may only be provided to online, or electronic customers, while in other embodiments, visual verification may be given to telephone, catalog, mail order, in-person, or any customer that has a suitable mechanism for delivery of the visual verification data, such as captured images and/or video.

In other embodiments, captured videos and pictures may be used to verify the validity of customer complaints regarding an order. For example, a customer may complain that they didn't receive one of the items in the order. With visual verification of order processing, video clips or images of the order being processed can be reviewed to verify the validity of the customer's complaint. Similarly, reviewing captured images may help discover and correct errors in order processing, according to various embodiments. For example, reviewing captured videos may help determine why a certain item breaks in shipment more frequently than other items.

Additionally, in some embodiments, verification data, such as captured images, may be reviewed at virtually any location, not just at the order fulfillment center. For example, captured images may be available over the Internet, or may be transferred via email or other electronic data communication to wherever they are to be reviewed. In some embodiments, captured images may be made available electronically over a network such that the images are randomly accessible over the network. Companies may take advantage of the fact that captured verification data may be reviewed anywhere in the world to employ personnel in different locations, such as close to customers, or where labor costs are less. Thus, in one embodiment, a customer service representative remote from an order fulfillment center may review captured images, or other verification data, related to a customer complaint. For example, customer service representatives located in Great Britain may review customer complaints for customers who live in England, even if the order was shipped from the United States.

Figure 2:
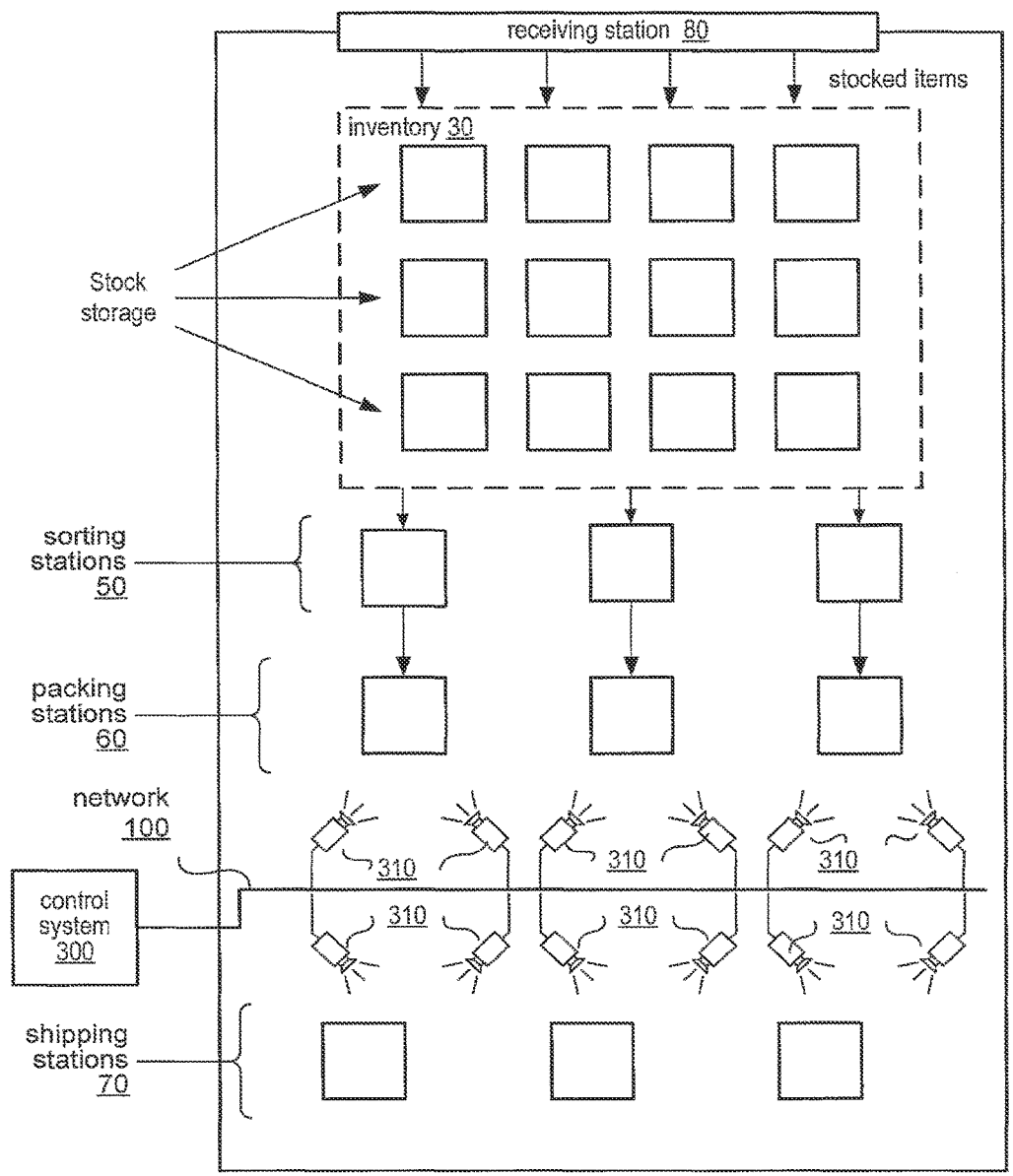
FIG. 2 illustrates one embodiment of an exemplary physical layout of an order fulfillment center.

FIG. 2 illustrates one embodiment of an exemplary physical layout of an order fulfillment center. Items for an order may be moved from inventory 30, through sorting stations 50, to one or more packing stations 60. The order fulfillment center illustrated in FIG. 2 includes various data capture devices, such as image capture devices, according to one embodiment. For example, an order fulfillment center may include one or more cameras or other image capture devices 310 configured to capture images of order processing at one or more processing stations, such as sorting stations 50, packing stations 60, and shipping stations 70, according to some embodiments. In one embodiment, all image capture devices 310 may represent still image capture devices, while in other embodiments, one or more of image capture devices 310 may represent video capture devices. Image capture devices 310 may be coupled to control system 300 via network 100. Control system 300 may, in some embodiments, be configured to control and manage the image capture process for all orders being processed in the order fulfillment center. In other embodiments, however, multiple control systems 300, or other computer systems may be configured to manage image capturing for the processing of orders. In yet other embodiments, one or more of image capture devices 310 may be manually controlled via facilities personnel. For example, a packing agent may manually capture images, either by directly controlling an image capture device, or via control system 300.

An order fulfillment center may be configured to have one or more image capture devices, either still, video, or both, coupled to a control system, or other computer system, configured to associate images of an order with the order and send the customer an electronic notification including the images or a reference to the images. The order fulfillment center may also include one or more motion detection devices or other sensors coupled to the control system and/or image capture devices to automate the capturing of images, according to one embodiment. For example, in one embodiment, the order fulfillment center may utilize sound-activated motion detection devices, while, in other embodiments, motion detectors based on ultrasonic, infrared, microwave, and/or video activated devices, may be used. In another embodiment, the order fulfillment center may include one or more manual devices allowing order-processing personnel (sometimes called agents) to manually initiate and terminate image capturing. In yet another embodiment, one or more image capture devices may be configured to continuously capture images or video, and a control system or other software (or hardware) system may analyze the continually captured images to determine which images include views of the order being processed. Any extraneous images captured may be discarded or saved for later review and/or processing, according to one embodiment.

Video or images, as well as other data, may be recorded or captured using any of a number of different techniques, as is understood in the art. For example, in one embodiment, standard, off-the-shelf cameras may be placed in appropriate places within a materials processing facility to capture one or more aspects of order processing. The images captured by the cameras may be saved and software may be utilized to separate and enhance those images to be sent to the customer, according to one embodiment. In other embodiments, small wireless cameras could be controlled by control system 300 and control system 300 may be configured to record video and/or capture images of orders being processed, associate the correct video and pictures with an order, and send out electronic notifications to the respective customers of the orders including video clips and/or still images of his order being processed. In yet other embodiments, other data such as environmental data, timing data, and/or authenticity data, may be captured and included in notifications. Additionally, captured data, such as images or video clips may be associated with their respective orders via any of a number of techniques, according to different embodiments. For instance, in one embodiment, every order may have an identification code on order paperwork that may be scanned, read, manually entered, or otherwise associated with the order during processing. Alternatively, a processing agent may read, scan, or manually enter an order ID code before starting to process an order and that order ID may be associated with any images captured during the processing of that order.

In another example, a radio frequency identification device (RFID) may be associated with an item during order processing and may be detected, either automatically or manually, as the item enters and/or exits various stages of order processing. For instance, an RFID may be temporarily attached to an item or more permanently attached to (or incorporated into or with) an item, according to different embodiments. Detecting an RFID may trigger the capturing of visual verification data characteristic of the particular stage of order processing. For example, an item may be detected, (e.g. by detecting an RFID, reading a scan code, or visually by processing personnel) upon arrival at a particular stage of order processing, and one or more types of data (e.g. images, audio, environmental, timing, etc) may be captured. Additionally, in other embodiments, information usable to associate a particular item with an order, or to associate a particular order with a customer, may be automatically collected. For instance, in one embodiment, a RFID may provide information allowing control system 300 to identify an item, match an item to a corresponding order, and/or match an order with a customer.

Additionally, in some embodiments, sound may be included with captured images. For example, visual verification video clips may include voice data indicating, or augmenting the order processing images, in one embodiment. Alternatively, a voice listing individual items being processed, or stating the customer name and/or address may be included with captured video clips. Additionally, captured video clips may also include voice data informing the customer how to access further images of his order being processed.

In some embodiments, a processed order may not be shipped in a single package. A shipped package may include only a subset of the ordered items available to ship at one time from one location. Thus, in some embodiments, images of more than one package may be captured and included in an electronic notification to a customer. Alternatively, a customer may receive multiple notifications, each referring to a separately shipped package of an order and each notification may include or reference captured images of the order, or part of the order, being processed.

Visual verification of order processing, as described herein, may, in some embodiments, be utilized as part of receiving 80, inventory 30 picking 40, sorting 50, packing 60, and/or shipping 70. For instance, an order fulfillment center may include a receiving station 80 for receiving shipments of stock from various vendors and placing the received stock into stock storage. In some embodiments, verification data may be captured of the receiving and unpacking of shipments to the order fulfillment center and the captured data may be associated with the received shipment and archived for later use. For example, images may be captured showing the receiving and unpacking on inventory shipments received at an order fulfillment center or other materials processing facility. Additionally, in some embodiments, other data may also be captured, such as the weight of a received package, the arrival date and time, the temperature and humidity of the receiving area (e.g. for shipments of perishable goods), timing data (e.g. how long a particular shipments stays in receiving before being moved into inventory), etc. Verification data captured during receiving and inventory processing may be collected and stored for later use either with notifications regarding orders for the received items, or for quality assurance and/or quality control. Additionally, verification data may be captured throughout various stages of inventory control, management, and/or tracking of inventory items. For example, in one embodiment, data may be captured that tracks an item from receiving, through inventory and order processing, to shipping. In another example, electronic identification or tracking devices, such as RFIDs may be attached to items at receiving allowing the automatic detection or locating of an item throughout a facility and for the entire life of an item from receiving/inventory through order shipping. As mentioned above, such electronic devices may be used to automatically trigger the collection or capturing of data characteristic of various stages of inventory management and/or order processing.

In some embodiments that include capturing images of order processing, the captured images may be of low resolution without any special lighting characteristics or concerns. In other embodiments, however, the areas of the facility where images may be captured may be arranged and lighted in ways to enhance the final captured images. In some embodiments, manual or automatic image processing may be utilized to enhance captured images. For example, lighting intensity, color values, and/or contrast may be adjusted so that a captured image better illustrates the processing of a particular item. In embodiments where data other than images may be captured, manual or automatic processing of the captured data may enhance the final data presentation. For instance, in one embodiment, binary or encoded data captured for an item may be automatically translated into a human readable version of the data. In another embodiment, multiple individual sets of collected data, such as temperature or other environment data may be combined into a single visual representation of that data (e.g. a temperature graph over time) to provide better visual verification of particular aspects of item and/or order processing. For example, individual sets of temperature, humidity and time data may be processed and combined into a single graphical representation of the environmental characteristics under which an item may have been stored and/or processed. Such data may be especially useful for perishable items such as food, wine, flowers, or other perishable products. Processed or enhanced visual verification data may be included in, or overlaid over, captured images or video, thereby clearly associating the captured data with the relevant item. As with captured images of order processing other data may also be used to verify or substantiate a customer (or vender) complaint regarding an item. As will be discussed in more detail below, collected visual verification data may be provided to a customer or other interested party allowing the customer to verify the proper handling and/or processing of an item or order.

Also note that the various operations of an order fulfillment facility may be located in one building or facility, or alternatively may be spread or subdivided across multiple buildings or facilities. Thus, in some embodiments, visual verification data may be captured in various locations, while a centralized control system may collect and coordinate the sending of notifications including the captured data.

In some embodiments, captured images may include images of items captured before an order for those items is received. For example, images of an item being received at an order fulfillment center, or being stocked, etc, may be captured, associated with that item and saved until an order is placed for the item. Once that item is ordered, previously captured images of that item being processed may be retrieved and included with images captured as the order is processed and may be sent to the customer as part of a visual verification of order processing. Additionally, visual verification may also apply to services as well. For example, a visual verification notification may include captured visual verification data regarding custom work or value-added services, such as engraving, monogramming, gift-wrapping, battery charging, etc., performed as part of an order. Such captured images may increase customers' confidence in the quality of a product where such quality may not be immediately apparent by inspecting the product itself. For instance, customers may want to be able to see the preparation of ordered food items, so they'll feel better about ingesting them. Thus, captured visual verification data may eliminate people's worry about whether food items were properly handled or prepared, according to some embodiments. For example, captured images may clearly show that kosher foods were prepared according to doctrine. As another example, time and temperature data for prepared food items may be captured to verify proper handling. For instance, the temperature of a refrigerated storage area may be captured and provided as verification of proper storage of perishable items. In one embodiment, audio information, such as a voice-over explaining how a value-added service is performed may be added to other captured data. Construction of jewelry is another example where the customer may receive proof, via captured images, that a handmade piece of jewelry was indeed made by someone who looks like a master craftsman, and was not manufactured by machine, according to one embodiment. In some embodiments, data characteristic of individual stages of a value-added service performed for an order may also be captured. Data regarding individual stages of a value-added service may be captured in ways similar to capturing images of the various stages of order processing for an item. In some embodiments, electronic devices, such as motion detectors or RFIDs, may automatically trigger the capturing or collecting of data for any or all stages of a value-added service. For example, images of authenticity seals or security stamps either already on items or be attached to items may be captured. Also, the individual serial numbers may be captured for individual items assembled and shipped as one unit. In other embodiments, data may be captured for each component used to assemble a personal computer system and may be included in a notification to the customer regarding an order.

Figure 3A:
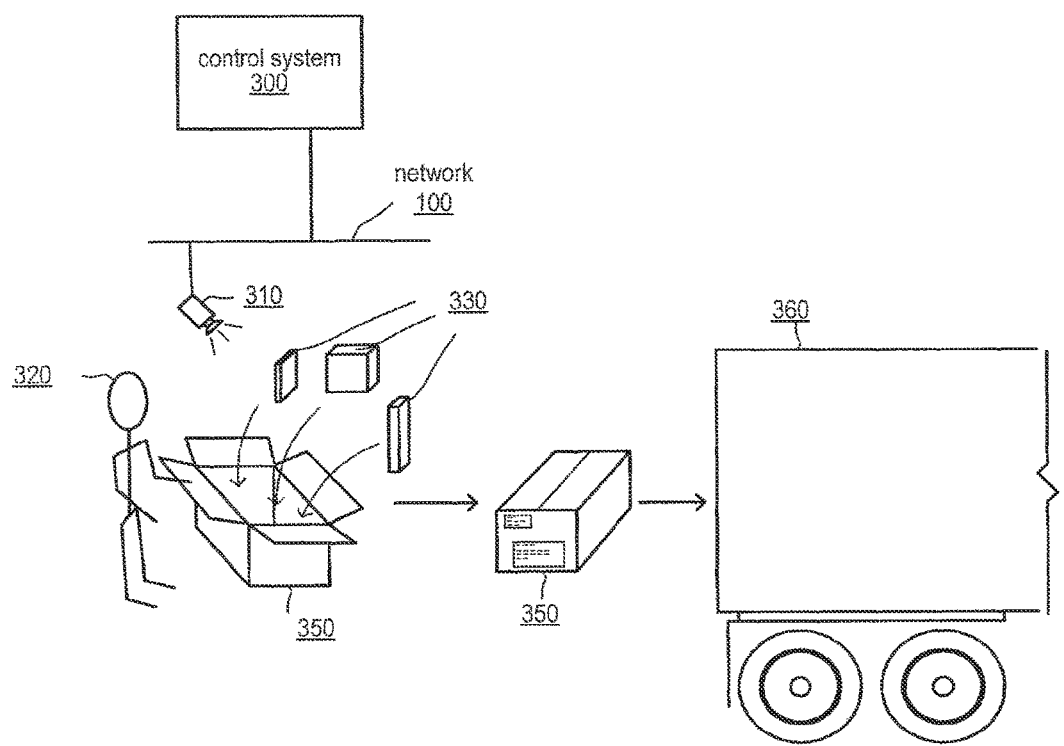
FIG. 3A illustrates capturing images of an order being processed at an order fulfillment center, in one embodiment.

FIG. 3A illustrates the capturing of images for an order being processed at an order fulfillment center, in one embodiment. For instance, a packing agent 320 may package one or more items 330 into shipping carton 350, in one embodiment. In one embodiment, images may be manually captured by an agent using a handheld image capture device, while in other embodiments, the image capture devices may be suitably situated to capture images of the processing of an order. In some embodiments, the image capture devices 310 may be rigidly fixed in place, while in other embodiments, they may be configured to move or pan about in order to better capture images of the entire order processing.

Image capture device 310 may capture images and/or video of the packing of the items 330 into shipping carton 350 and of packing agent 320 putting other items, such as packing materials (e.g. bubble-wrap, foam "peanuts", shredded paper, or other dunnage) and/or collateral materials, (e.g. flyers, advertisement, packing slip, receipt, offers, etc) in the box along with the items 330. For instance, third-party companies or other entities may have contracted an order fulfillment center to deliver collateral materials, such as flyers, advertisements, and/or other items, with orders processed at the order fulfillment center. Third parties may not be present when orders are processed and typically cannot be present when a customer opens a delivered order and thus may have no way to verify that the collateral materials were properly included with an order. Captured images of collateral materials being put into packages during order processing may assure such third-party entities that the proper materials were correctly included in orders. For example, a company may desire to have advertisements shipped only with orders for certain items, and captured images of packaging at the order fulfillment center may allow that company to verify that the advertisements where included with orders for the correct items. In other words, captured images of collateral materials being put into order packages may provide proof that the correct customers received the appropriate inserts.

In some embodiments, access to captured images may be electronically provided to third parties, such as via email, FTP, or one or more web services. For instance, an order fulfillment center may provide a web server that stores captured images. Additionally, web services or web interfaces may be provided to automate the process of reviewing captured images. Such web services may include interfaces to automate processes for logging into a web server, locating appropriate captured images, reviewing images, and recording feedback from the image review process, according to some embodiments. Furthermore, an order fulfillment center may also notify third parties when images are available for review. In one embodiment, an automated notification, similar to notifying a customer that an order has been processed, may be sent to a third party indicating that captured images may be available for review. In one embodiment, an email message may be sent to notify third parties regarding the availability of captured images. In another embodiment, a third party may be notified of available images when he logs into a web server providing web services for reviewing captured images. In other embodiments, other form of notification may be used, such as instant messaging, facsimile, cell phone messaging, etc.

Additionally, verification data, such as captured images of collateral materials already in or being put into order packages, may also provide a way to verify that special instructions were followed regarding how the collateral materials should be put into shipping packages. For instance, an advertising company may have contracted to have certain advertisements delivered with orders and may have requested that a specific advertisement be face up on top when a customer opens the package. Captured images may be used to verify that packing agents in the order fulfillment center properly followed such instructions. Having the ability to verify that collateral materials are properly processed with orders may allow companies to charge more for including such materials with orders. Additionally, using captured images to verify proper collateral material processing may be more cost effective than other forms of verification, such as random inspections, and also may allow for more precision in targeting specific types of customers with custom generated inserts.

In some embodiments, as noted above, any of various means may be used to initiate the capturing of data, such as images, of collateral material being placed in order packages. For example, in one embodiment, a RFID (or other electronic identification device) associated with an order, such as one temporarily or permanently attached to an item, may be detected by control system 300 and trigger the capturing of data related to collateral material processing for the order. In some embodiments, a processing agent may manually initiate the capturing of data, while in other embodiments, automated processing of continuously captured video data may determine when to capture data regarding this stage of order processing. In yet other embodiments, detecting electronic identification tags on items or orders may trigger automated or automatic collateral material insertion. For instance, collateral material may be automatically inserted into packages, such as by a custom packing device, and may be initiated when one or more RFIDs indicate that an order is in position for the collateral material.

In one embodiment, packing agent 320 may appear in one or more of the captured images packing, shipping, or otherwise processing the order. Control system 300 may receive the captured images and store them in a captured image database and associate them with the order being processed. In one embodiment, control system 300 may immediately send an electronic notification message informing the customer that his order is being or has been processed. In other embodiments, however, control system 300 may not send such a notification message until signaled to do so by some other event, such as by the manual entry of confirmation that the processed order actually left the facility. In one embodiment, control system 300 may capture images of the finished, sealed, addressed order being loaded on delivery vehicle 360.

In one embodiment, such as illustrated by FIG. 3A a single packing agent 320 may process the entire order alone. In other embodiments, however, multiple packing agents 320 may each perform a different part of processing an order, as will be described below regarding FIG. 3B. Thus, in some embodiments, multiple images captured by multiple cameras are each associated with the order rather than a single camera capturing all areas of order processing.

Figure 3B:
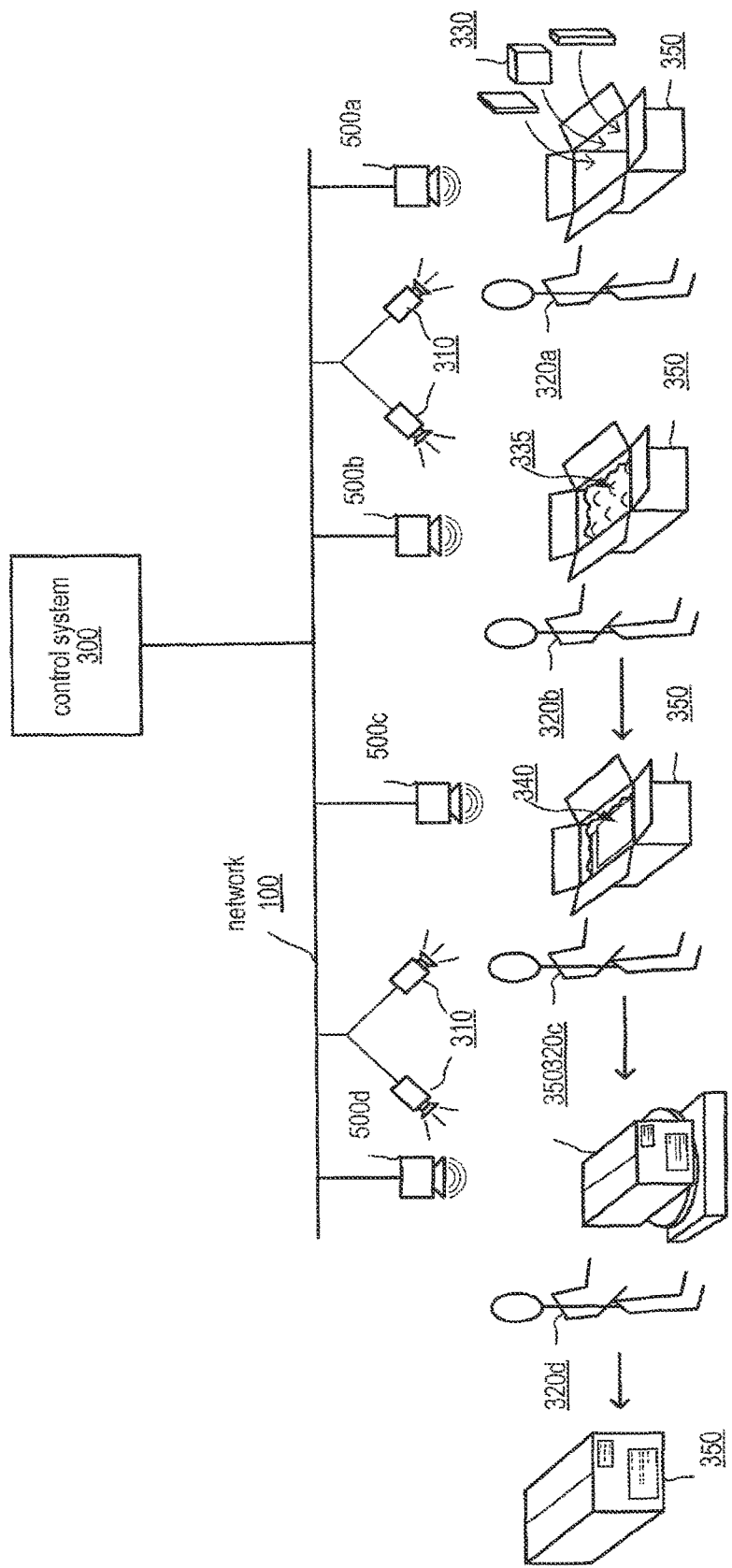
FIG. 3B illustrates another embodiment of an order being processing at an order fulfillment center.

FIG. 3B illustrates another embodiment of an order being processing at an order fulfillment center. While FIG. 3A, discussed above, illustrates single packing agent 320 and a single image capture device 310, FIG. 3B illustrates a station or stations where multiple processing agents 310 each perform one part of processing an order and multiple image capture devices 310 may be utilized in the capturing of images of the order processing. Thus, processing agent 320 may pack ordered items 330 into a shipping carton 350, processing agent 320b may insert packing material 335, such as foam peanuts or shredded paper, into shipping carton 350 around items 330, processing agent 320c may insert collateral materials 340, such as a receipt, packing slip, flyers, and/or advertisements, into shipping carton 350, and processing agent 320d may seal, address and weigh shipping carton 350, according to one embodiment. In other embodiments, different numbers of processing agents may perform different processing functions or perform them in a different order than illustrated by FIG. 3B.

FIG. 3B also illustrates multiple motion detecting devices 500, or other sensors, that may be configured to trigger data capture as an order progresses through the packing station. In some embodiments, each motion detection device 500 may be coupled to one or more individual data capture devices, such as image capture devices 310, such that data are captured based upon motion detected by the motion detection device. For example, motion detection device 500 may be coupled to image capture device 310 may detect the motion caused by a packing agent packing shipping carton 350 with ordered items 330 and may initiate capture of one or more images of the agent packing shipping carton 350. In other embodiments, however, control system 300 may receive indications from each motion detector 500 and may coordinate the capturing of data, such as images, based on the received signals from the motion detectors 500. In yet other embodiments, proximity sensors or radio frequency identification devices (RFIDs) may detect the presence of an order and thus may at least partially automate the capturing of data.

In some embodiments, one or more of motion detectors 500 may represent electronic beams or eyes, while in other embodiments, infrared, radar-based motion detectors may be utilized. Alternatively, as discussed above, manual triggers may also be used by processing agents to trigger image capture of order processes. For example, a processing agent may use a foot switch to trigger an image capture device 310 to take a picture. In one embodiment, a processing agent may directly control an image capture device 310, while in other embodiments, a processing agent may use a manual trigger to signal control system 300 that an image should be captured at that particular processing station and control system 300 may control an image capture device 310 to capture the images. For example, processing agent may step on a pressure mat at a processing station whenever an order is being processed and may step off the pressure mat whenever he is not processing an order. The pressure mat may in turn control the capturing of images.

In some embodiments, processing agents may use identification codes when processing orders. For example, identification codes on individual items or on paperwork associated with an order may be read, either manually or via a reading device, as the order is being processed. In one embodiment, control system 300 may use the identification codes as part of tracking the progress of an order through a processing station or through the order fulfillment center. In other embodiments, the reading of a identification code may itself trigger the capturing of images. Additionally, in some embodiments, captured images may be associated with a identification code for an order. In some embodiments, processing agents may use devices configured to read or scan identification codes, either from individual items, order paperwork, or both. In other embodiments, however, processing agents may manually enter identification codes.

Thus, as illustrated in FIG. 3B, multiple processing agents may process an order and images may be captured of the order being processed in any of a number of different manners, according to different embodiments. For instance, in one embodiment, agent 320a may pack individual items 330 into a shipping carton 350 and may manually trigger the capturing of images of each item being packed into the shipping carton. In another embodiment, motion detector 500a may trigger the capturing of images of items 330 being packed into shipping carton 350 by processing agent 320a. For example, the physical activity of packing the items 330 into shipping carton 350 may trigger motion detector 500a to initiate the capturing of images.

Figure 4A:
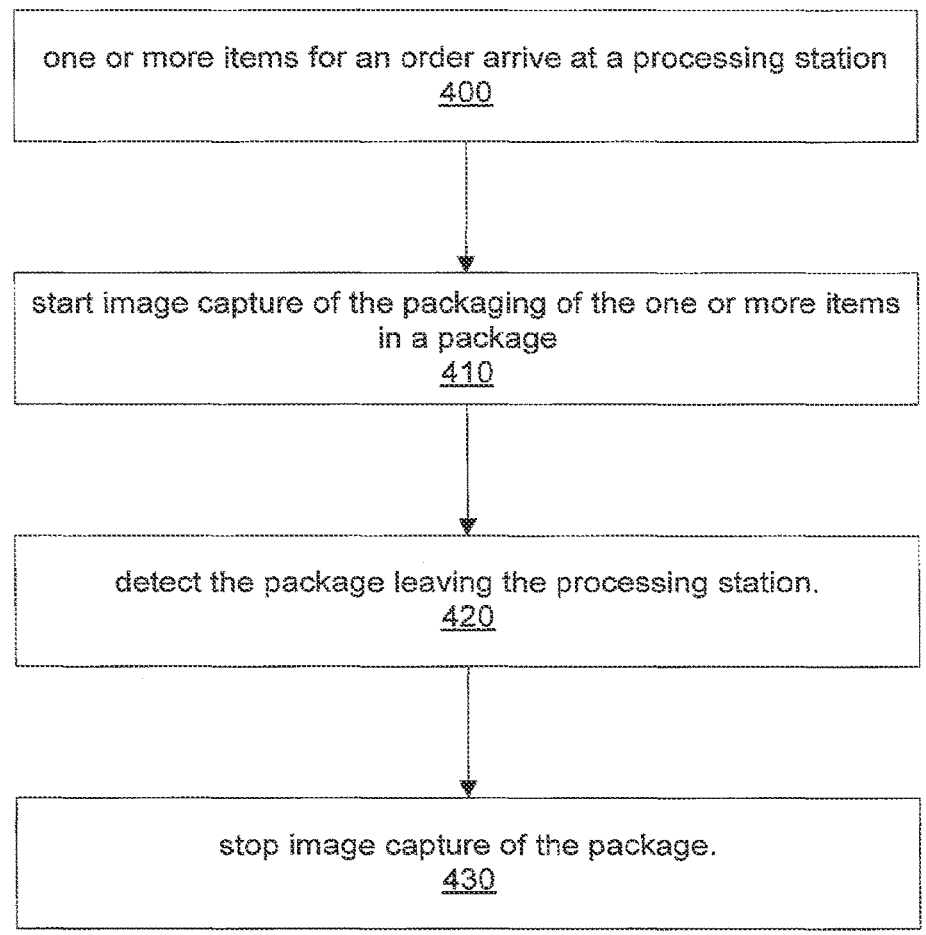
FIG. 4A illustrates one embodiment of a method for capturing images of an order being processed at an order fulfillment center.

FIG. 4A illustrates one embodiment of a method for capturing images of an order being processed at an order fulfillment center. As illustrated by block 400, one or more items for an order may arrive at a packing station. In other embodiments, the method illustrated in FIG. 4A may also be performed at any of a number of processing stations in a materials handling facility, such as a sorting station, packing station, quality assurance station, and/or shipping station, among others. The items for an order may be hand delivered to the packing station in one embodiment. In other embodiments, however, various conveyance means, such as conveyor belts, may be used to deliver the items to the packing station. After the items for an order have arrived at the packing station, a control system, such as control system 300, may start capturing images of the packaging of the one or more items in a package, as illustrated by block 410.

In some embodiments, processing agents may use one or more manual switches to initiate the capturing of images. For example, in one embodiment, processing agents may manually initiate image, or video, capture when the items of an order arrive at the packing station. In other embodiments, however, processing agents may manually instigate the capturing of each image individually as the items are being processed and packaged for shipping. Any of a number of different types of suitable manual switches, such as buttons, toggle switches, levers, foot pedals, etc. may be used, in various embodiments, to initiate the capturing of images. In some embodiments, an identification code reader, such as a scan-code reader, may also serve as a manual image capture trigger. In other embodiments, image or video capturing may be initiated automatically by control system 300, or another computer system configured to do so. For example, the order fulfillment center may include one or more motion detection devices in and around the packing station configured to detect the arrival of items for processing and/or packaging. In one embodiment, a motion detector, such as motion detector 500, illustrated in FIG. 3B and described above, may detect the arrival of one or more items to the packing station and may signal control system 300. In response, control system 300 may communicate with one or more image capture devices, such as camera(s) 310, to start and stop image capture, in one embodiment.

In one embodiment, control system 300 may initiate image capturing on a camera by camera basis, while in another embodiment, control system 300 may instruct all the cameras in the packing area to capture images concurrently. In another embodiment, packing station 60 may be equipped with both still image and video capture devices and control system 300 may initiate capturing of both still images and video for an order. In some embodiments, control system 300 may monitor, via multiple motion detectors 500, the movement of the items and/or package for an order through packing station 60 and may turn on and off individual image and/or video capture devices 310 as the items and package progress through the packing station.

In other embodiments, however, all cameras in packing station 60 may be continually capturing images (or video) and control system 300 may utilize signals from motion detector(s) 500 to monitor an order being processed and match up (or associate) the captured images with the correct order. For instance, in some embodiments, a processing station may be continually processing orders one after another such that as one order is starting to be processed in one area, another order may be being packaged for shipment in another area. In such an embodiment, control system 300 may be able to determine how to correctly associate captured images with the appropriate order by utilizing the signals from one or more motion detector(s) 500. In other embodiments, however, the packing personal processing an order may utilize a scanning device to read an identification code associated with the order throughout the processing of the order and thus control system 300 may be configured to receive the identification code data and use it to match captured images with the correct order. Any extraneous images, either images not of an order being processed or images that are not suitable for inclusion in electronic notification messages to customers, may be erased, deleted, or otherwise discarded, according to various embodiments.

After the items have been processed and packaged, the package may be moved out of the processing station. Detecting a package leaving the processing station, as illustrated by block 420, may signal the stopping of image capturing for the package and order, as illustrated by block 430. Similarly to how control system 300 may, as described above, track or monitor the processing of an order throughout the packing process, control system 300 may, in some embodiments, automatically detect the completion of order processing and stop capturing images accordingly. In one embodiment, one or more motion detector(s) 500 may be configured to detect when a processed order leaves the packing station and signal that fact to control system 300. In other embodiments, however, control system 300 may be configured to determine when an order has left the packing station by analyzing the captured images.

For instance, in one embodiment, control system 300 may be configured to analyze the differences between consecutively captured images to determine when an order has left the packing station. In yet other embodiments, packing personnel may manually signal the completion of order processing for an order via one or more manual switches, such as buttons, levers, foot pedals, scan code readers, etc. For example, after processing an order, a processing agent may use a scan code reader to read an identification code on the packed and sealed order and control system 300 may receive the identification code and information indicating the completion of order processing for that order. In some embodiments, images may be continually captured and control system 300 may analyze the captured images, or receive motion detection or manual signals, in order to determine which of the images to associate with a particular order. Thus, control system 300, or another computer system, may determine when to start and stop image capture for an order via a number of different mechanisms.

Figure 4B:
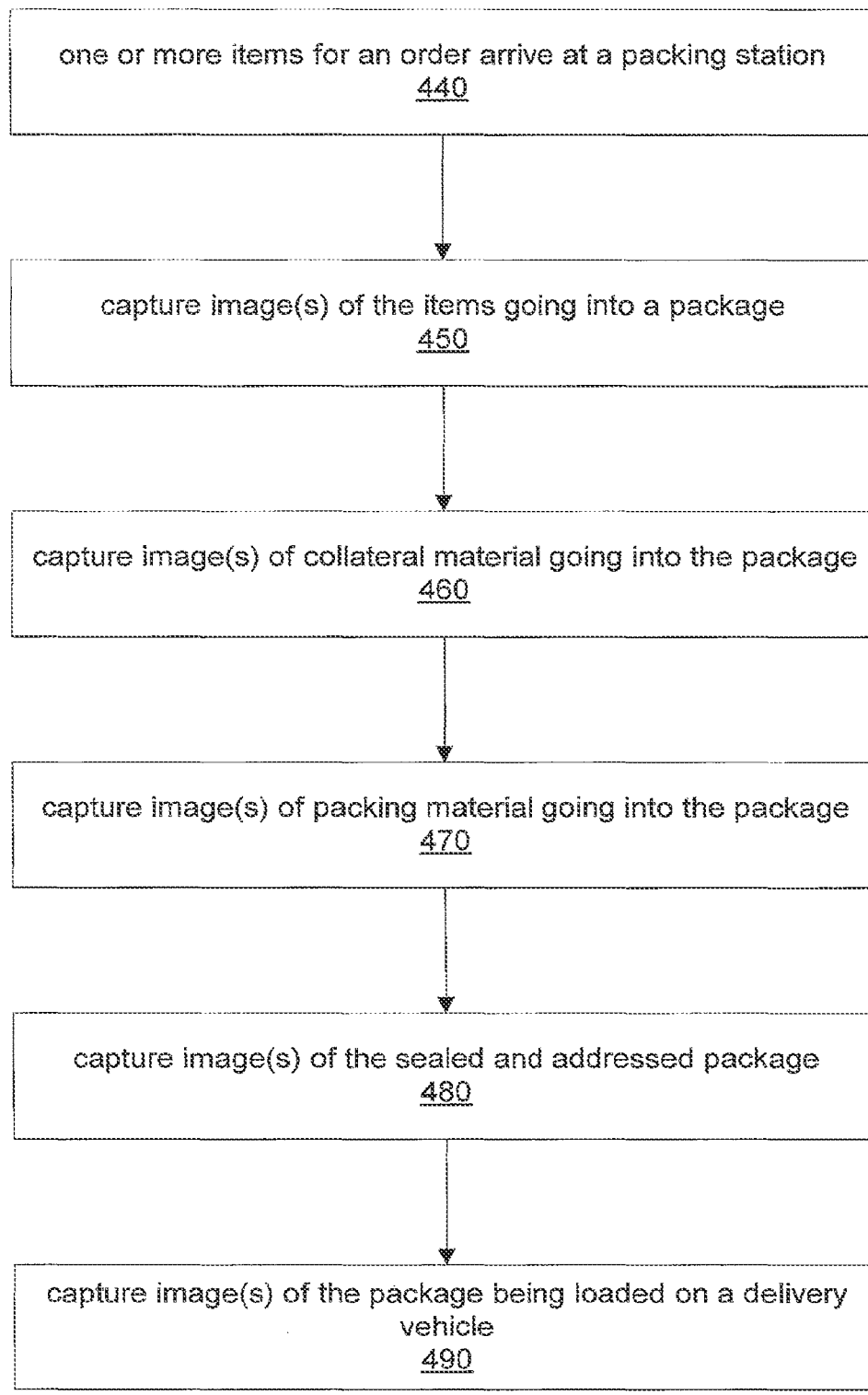
FIG. 4B illustrates another embodiment of a method for capturing images of an order being processed at an order fulfillment center.

FIG. 4B illustrates another embodiment of a method for capturing images of an order being processed at an order fulfillment center. As with the method illustrated in FIG. 4A and described above, the method illustrated by FIG. 4B begins, in some embodiments, when one or more items for an order arrive at a packing station, as shown in block 440. As described above, the items for an order may arrive at packing station 60 in any of numerous ways, according to different embodiments. For example, in one embodiment, items for an order may be manually transferred to packing station 60. In another embodiment, packing station 60 may receive the output from one or more automated sorting machines.

After the items for an order arrive at the packing station, images of various stages of order processing may be captured and associated with the order. For example, in one embodiment, images of the items being packed into a package may be captured, as illustrated by block 450. In another embodiment, images of the items being processed for packing, such as being wrapped in shrink-wrap, may also be captured. Additionally, as illustrated by block 460, images of one or more types and items of collateral material being put packed with the order may also be captured. For example, receipts, packing slips, advertisements, offers, etc. may be shipped with each order and the packaging of such items may be captured or recorded. Images or video of packing material, or dunnage, being put into the package may also be captured, as illustrated by block 470. In some embodiments, images of the packing personnel processing the order may also be captured.

Additionally, the sealing and addressing of the package may also be recorded and images of the finished, sealed and addressed package may be captured, as illustrated by block 480. In one embodiment, the customer name and the shipping address may be visible in the captured image(s) of the processed order. In another embodiment, images may be captured of the finished package being weighed and the shipping weight may be visible in the captured image(s). In one embodiment, the weighing of a package may automatically initiate the capturing of images of the package being weighed. Finally, video or images may be recorded of the package being loaded in a delivery vehicle, as illustrated by block 490. In general, when capturing images of the processing of an order, one or more of the image capture devices may be configured to insert, append or otherwise include the date and time the image was captured in the captured image. In other embodiments, control system 300 may be configured to insert, append or otherwise include the date and time in captured images. In some embodiments, the customer name, an order identifier, other information associated with the order may also be inserted, appended or otherwise included in the captured images. As various methods of image manipulation are well known in the art, and as any suitable image manipulation method may be used to include additional text or images in captured images, those methods will not be discussed in detail herein.

Figure 5A:
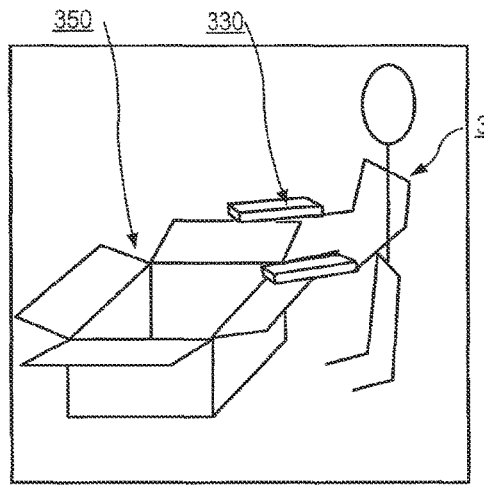
FIGS. 5A-5E illustrate exemplary images captured of an order being processed at an order fulfillment center.

FIGS. 5A-5E illustrate exemplary images captured of an order being processed at an order fulfillment center. As described above, images of an order being processed may be captured and associate with the order. FIGS. 5A-5E illustrate sample, or example, subject matter that may be captured according to various embodiments. For example, FIG. 5A illustrates an image showing processing agent 320 putting ordered items in a shipping box. Images, or video, may be captured of the processing agent putting each item in the package, in one embodiment. Alternatively, in other embodiments, multiple images may be captured, each one showing the processing of an individual item from an order. Additionally, an item may be positioned by processing agent 320 to ensure that any custom service or enhancement to the item may be visible in one or more captured images. For example, if an item has been custom engraved with a customer's initials, processing agent 320 may ensure that the item is positioned, at least temporarily, such that the engraving is visible in a captured image.

Figure 5B:
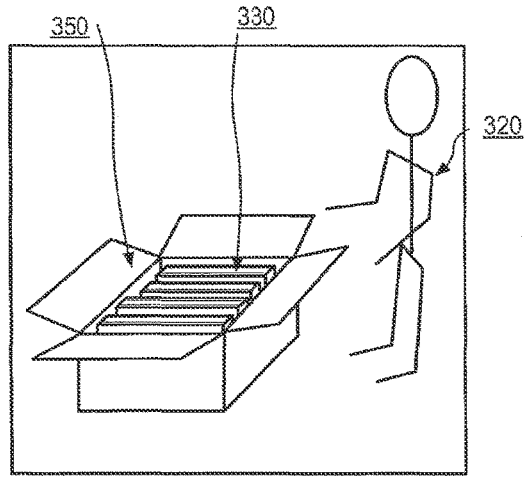

FIG. 5B illustrates a captured image of shipping carton 350 loaded with ordered items. In some embodiments, the items in the box may be situated or arranged such that the items may be easily identified in the image, thus allowing a customer to recognize the items ordered. For example, books may be arranged in a package carton such that their titles are visible in captured images. In other embodiments, text identifying the items may be added to the captured images, as will be discussed below. In some embodiments, an order may require more than one shipping carton and multiple images may be captured, each showing an individual shipping carton packed with items.

Figure 5C:
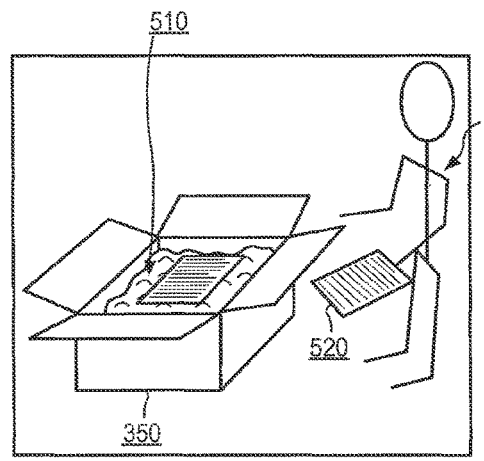

FIG. 5C illustrates a captured image showing packing agent 320 inserting packing material and collateral material in the package. As discussed above, images may be captured of the type and amount of packing material used in the packing of an order. Thus, in some embodiments, a customer may be able to verify that items were packed correctly at the order fulfillment center. Additionally, in certain embodiments, captured images showing packing material being put into a shipping carton may be reviewed later to determine why an item was damaged in shipment. In some embodiments, image may captured of processing agent 320 putting one or more pieces of collateral material, such as packing slips, receipts, advertisements, offers, announcements, and/or promotional items into shipping carton 350.

Figure 5D:
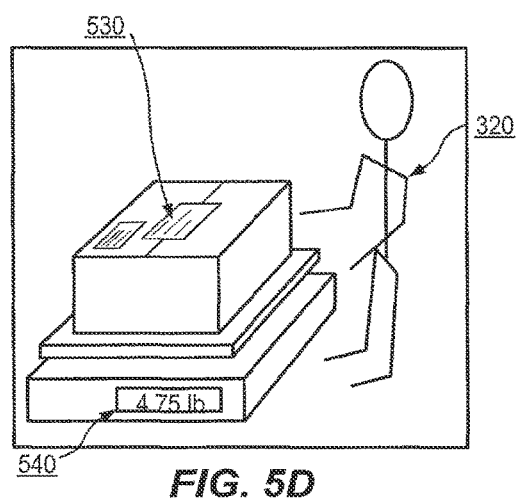

FIG. 5D illustrates a captured image of processing agent 320 weighing a sealed and addressed shipping carton 350, according to some embodiments. As with the other order processing tasks discussed above, images may be captured of the sealing, addressing, and weighing of shipping carton 350. In one embodiment, the weight 540 of shipping carton, as shown on a scale, may be visible in the captured image. In other embodiments, the weight of the package may be added to or superimposed on the captured image, either automatically, such as by control system 300, or manually.

Figure 5E:
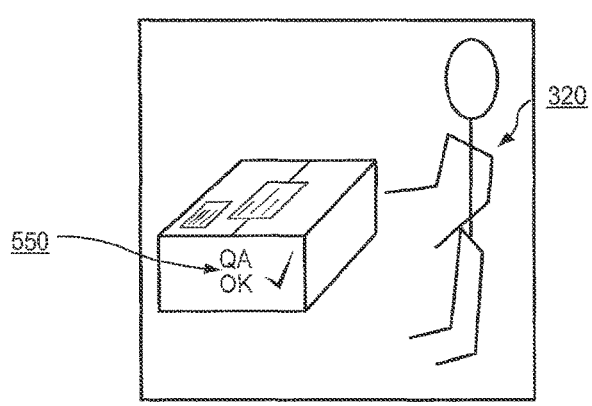
Figure 6A:
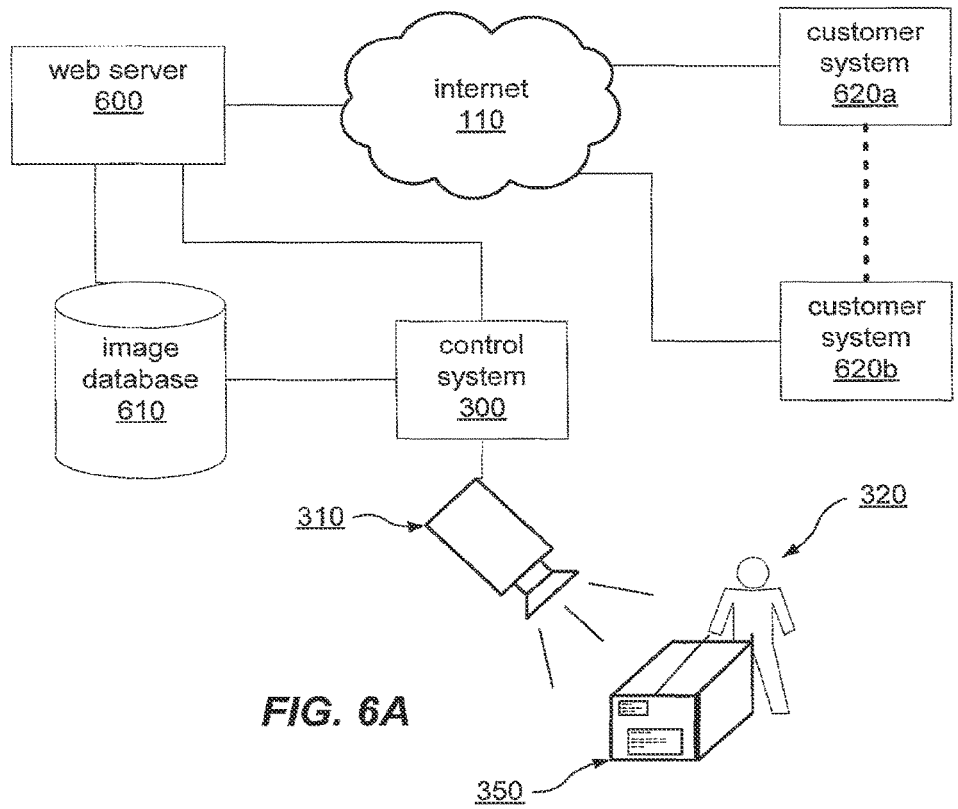
FIGS. 6A and 6B illustrate systems configured to capture images of order processing and to include captured images in electronic notifications to customers, according to one embodiment.
Figure 6B:
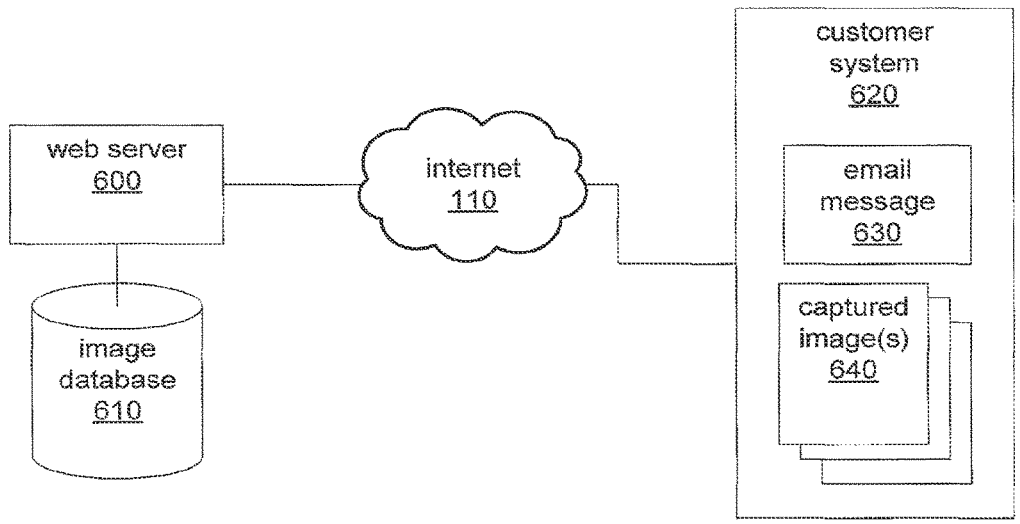

FIG. 5E illustrates an image of a QA agent giving the processed order a final approval. In some embodiments, a sticker, label, or other indication of a positive quality assurance determination may be visible on the package or otherwise in the image. For example, in one embodiment, video of a QA agent affixing a QA sticker to the package may be recorded. In another embodiment, a QA agent may be smiling and giving a "thumbs-up" to a camera while displaying the processed order showing the customer's name and address on a shipping label of the package. FIGS. 6A and 6B illustrate systems configured to capture images of order processing and to include captured images in electronic notifications to customers, according to one embodiment. FIG. 6A illustrates a system for capturing images of order processing and sending an electronic notification indicating the completed processing and/or shipping of the order to a customer. For example, in one embodiment, a customer may order, via the internet 110 and web server 600, one or more items. The order may be processed, as described above, with images of the order processing being captured by one or more image capture devices 310. In other embodiments, a customer may place the order in any number of ways, including, but not limited to, via online ordering, over the telephone, via mail order, in person, etc, and may still receive an electronic notification including one or more captured images (or links or references to the images) of the order being processed and/or shipped. In general, any manner of order placement may be utilized with visual verification of order processing, as described herein.

After an order has been placed, the order may be processed at an order fulfillment center, as described above. One or more images, either still or video, may be captured of the order being processed. Control system 300 may, according to one embodiment, receive the captured images, associate them with the order, and store them in image database 610 where web server 600 may make them available over the Internet 110. For example, in one embodiment, a separate web page may be automatically and dynamically generated for each order, while in another embodiment, such a web page may only be generated once the customer attempts to access the images, as will be discussed below.

Control system 300 may send the customer an electronic notification, such as an email message, instant message, cell phone picture, text message, or other electronic notification, including one or more captured images of the order being processed, and/or the electronic notification may include a link, URL, or other reference usable to access the captured images. Control system 300 and/or web server 600 may apply various security and/or authentication measures to prevent unauthorized access to captured images of orders being processed, esp. in embodiments where a customer's name and/or address may be visible in one or more of the images. The electronic notification may also include information regarding any such security measures and may also, in some embodiment, include all or partial authentication credentials necessary for accessing captured images. For example, in one embodiment, the electronic notification may inform the customer to login to web server 600 using a name and password the customer had previously setup, such as when originally placing the order. In another embodiment, however, login information, or other authentication credential information may be included in the electronic notification, or in separate electronic notification.

Captured images may be stored using any of a number of different image formats, such as Microsoft Windows bitmap (BMP), computer graphics metafile (CGM), graphic interchange format (GIF), PC Paintbrush format (PCX), JPEG file interchange format (JPEG), tagged image file format (TIFF), and/or many others.

FIG. 6B shows a system similar to that illustrated in FIG. 6A. FIG. 6B illustrates customer system 620 receiving email message 630 that may contain one or more captured images 640. In one embodiment, email message 630 may include captured images 640 in the body of the email message. In another embodiment, email message 630 may include captured images 640 as attachments to the email message. In yet another embodiment, email message 630 may include links or references usable to locate the captured images via Internet 110 and web server 600. For example, email message 630 may include a URL or other link to a web page provided by web server 600 that displays the captured images 640, such as from image database 610. In other embodiments, email message 630 may include one or more video or audio clips, or may include links or references to one or more video or audio clips.

Figure 6C:
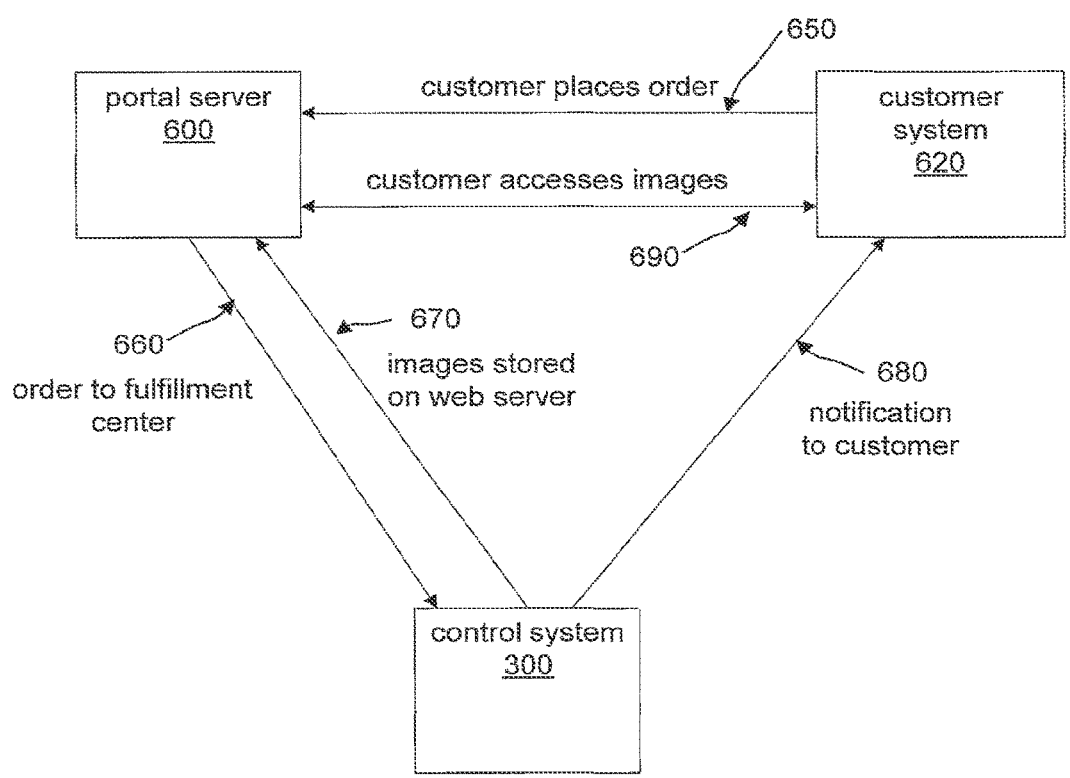
FIG. 6C illustrates a logical flow of communication during visual verification of order processing, according to one embodiment.

While FIGS. 6A and 6B, described above, illustrate the connections between various entities involved with visual verification of order processing, FIG. 6C illustrates a logic flow of communication between entities. For example, a customer may place an order for one or more items through web server 600, such as illustrated by arrow 650, according to one embodiment. In other embodiments, however, orders may be placed via other methods, such as via telephone, a mail order catalog, or in person at a physical storefront. Regardless of how an order is placed, the order and any information necessary to process the order may be sent to the order fulfillment center. In some embodiments, the order may be sent from web server 600 to control system 300, as illustrated by arrow 660. For instance, web server 600 may include an online catalog of items and an online purchasing or ordering system. After a customer places an order through web server 600, the order information may be sent electronically to a computer system, such as control system 300, at the order fulfillment center. In other embodiments, the order may not be sent directly to the order fulfillment center, but may first be sent to one or more other entities, such as salespeople, customer service representatives, etc. Once the order information has been received by control system 300, the order may be processed at the order fulfillment center as described herein, according to some embodiments.

As described herein and according to various embodiments, one or more images of the order being processed may be captured and associated with the order. In one embodiment, the captured images may be sent to and stored on web server 600, as illustrated by arrow 670. Captured images of the order being processed may also be included in an electronic notification sent to the customer of the order, as illustrated by arrow 680. In one embodiment, one or more captured images may be included in the notification, such as in an email message or as attachments to an email message. For example, one or more captured image may be included in embedded HTML in the body of an email message, according to one embodiment. In some embodiments, the electronic notification message to the customer may include a URI, link, or other reference to web server 600, allowing the customer to access and view the captured images stored thereon. In other embodiments, the electronic notification may include one or more captured images as well as a link or reference to the same and/or additional captured images stored on web server 600. The customer may use the link or reference in the electronic notification to access the captured images stored on web server 600 as illustrated by arrow 690, according to some embodiments. In one embodiment, the notification message may also include other information, such as login credentials, required by the customer to access the images on web server 600.

Figure 7:
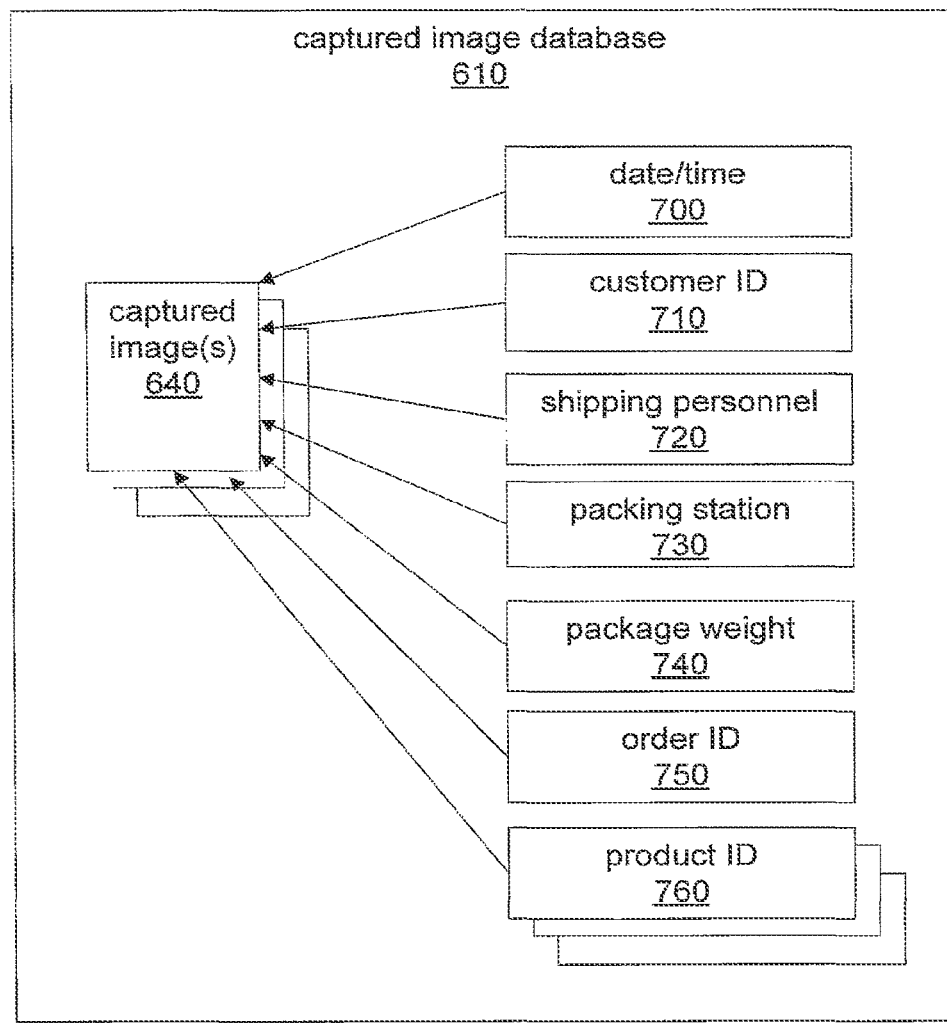
FIG. 7 illustrates an image database of captured images, in one embodiment.

FIG. 7 illustrates an image database of captured images such as may be used to store images on web server 600, according to some embodiments. In other embodiments, however, such a database may store other types of captured data, such as audio, date/time, environmental data, or other data, either instead of or in addition to captured image data. In some embodiments, captured visual verification data may be processed or enhanced before provided to a customer or other interested party. For instance, additional textual or graphic information may be added to captured images before the images are made available to a customer, either by the image capture device that captured the image or by control system 300, according to various embodiments. For example, in one embodiment, the date and/or time that an image was captured may be added to the captured image. Additionally, a customer name, or ID may be added to a captured image. Alternatively, information such as shipping personnel's names, packing station identifiers, the shipping weight of a package, environmental data, product identifiers, and/or order identifiers may also be added to the captured images. In general, any type of additional data or information that is relevant to and/or characteristic of an aspect of order processing may be added to or included with captured visual verification data. Such additional information and/or indicators may be included in, inserted into, overlaid over, or otherwise added to captured videos and still images in any of numerous ways, as is well understood in the art. The modification or enhancement of captured images may be performed manually, automatically, or as a combination of both. As various methods of image manipulation are well known in the art, and as any suitable image manipulation method may be used to include additional information in captured images and/or video, those methods will not be discussed herein. In some embodiments, however, captured or collected data may not be enhanced so that a customer or other party is provided with raw, unaltered data.

Figure 8A:
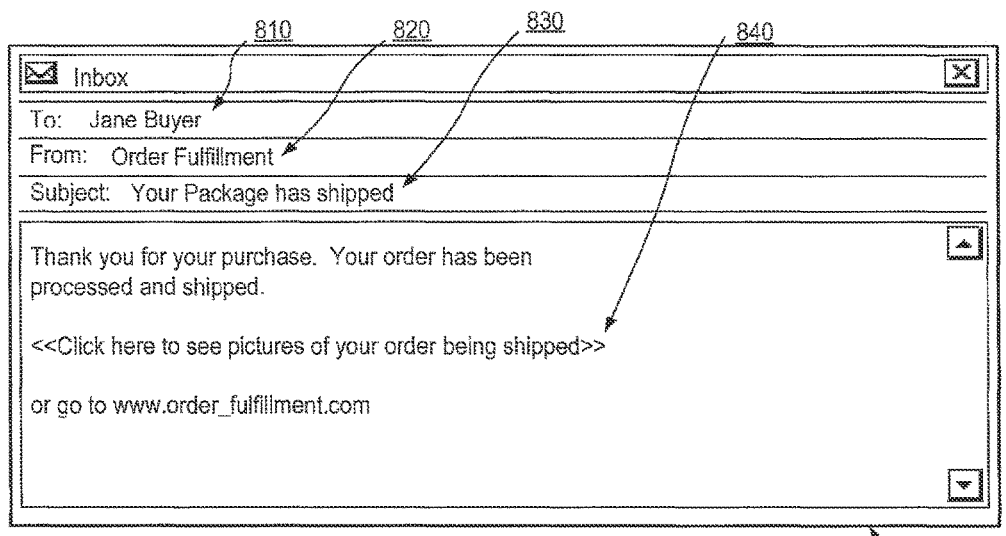
FIG. 8A illustrates an exemplary electronic notification including a reference to captured images of an order, according to one embodiment.

FIG. 8A illustrates an exemplary electronic notification including a reference to captured images of an order, according to one embodiment. As described above, control system 300 may, in one embodiment, send email message 800 informing a customer that an order has been processed and/or shipped. Email message 800 may include a link or reference 840 (such as a URL) that may allow the customer to access captured images showing the order being processed, in one embodiment. In some embodiments, email message 800 may also include one or more captured images in addition to a link or URL. For example, in one embodiment, control system 300 may send email message 800 including one captured image of a processed order and include a link to additional captured images of the order being processed. For instance email message 800 may include, in the body of the email or as an attachment, one image showing a sealed and addressed shipping carton with a customer's name and address visible while including a link to additional images of other stages of order processing. Thus, the customer can verify that order was actually processed and shipped and consequently that the received email message was not merely sent automatically in anticipation or expectation of the order being shipped.

Figure 8B:
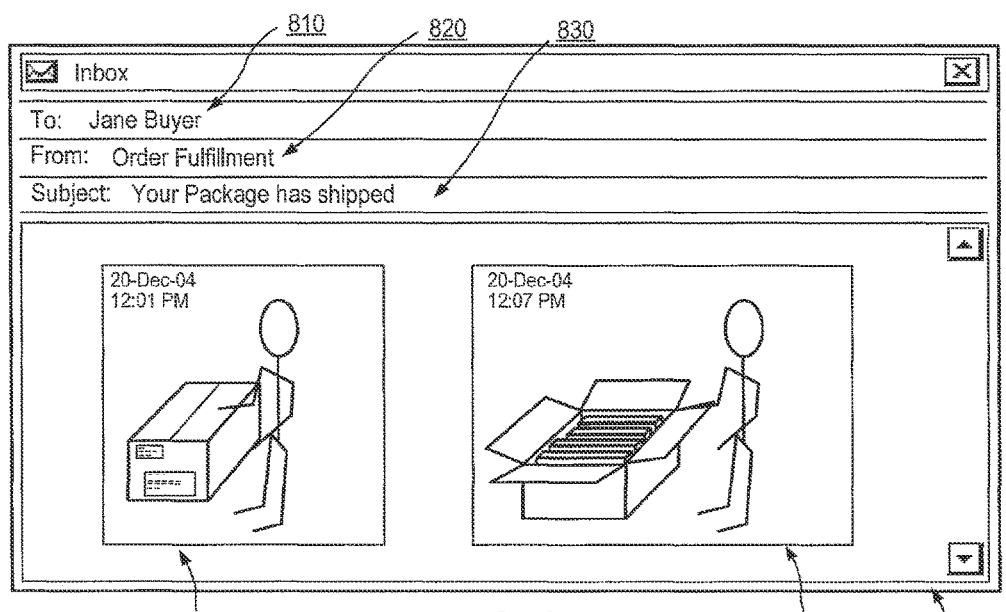
FIG. 8B illustrates an exemplary electronic notification including captured images of an order, in one embodiment.

FIG. 8B illustrates an exemplary electronic notification including captured images of an order, in one embodiment. In some embodiments, control system 300 may send email message 800, and email message 800 may include one or more captured images of an order being processed. In some embodiments, an electronic notification may include images or video clips and may also include one or more links to other video clips or images of the order being processed. In general, any manner of electronically delivering images may be utilized with an electronic notification such as email message 800.

Electronic visual verification notifications, such as email message 800, may also include other information regarding the order, such as a listing of the items in the order, any issues or problems with the order, an order receipt, and/or other information regarding the order and/or customer.

While FIGS. 8A and 8B illustrate using an email message as the mechanism for delivering visual verification data, such as captured images, to a customer, other embodiments may use different types of electronic notification, such as an "instant message", pager or text messaging, or sending pictures to cell phones. In some embodiments, control system 300 may send an electronic notification, such as an email message that includes one or more captured images but that may also include a link or reference to additionally captured images. In other embodiments, different forms of electronic notification may be used instead of or in addition to the email messages and instant messages described above.

Figure 8C:
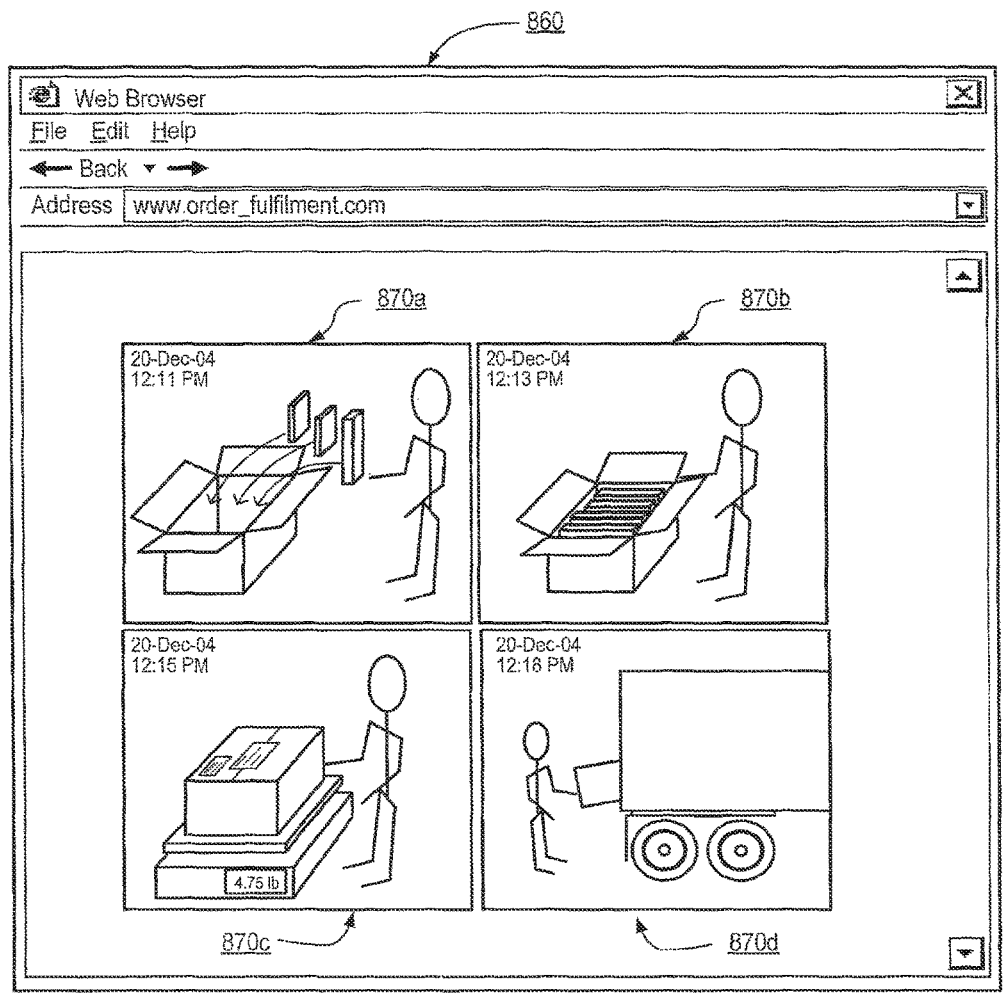
FIG. 8C illustrates one embodiment of a webpage displaying captured images of an order.

FIG. 8C illustrates one embodiment of a webpage displaying captured images of an order. In some embodiments, control system 300 may send a notification to the customer including a link (such as a URL) to a webpage 860 displaying one or more captured images of an order being processed for the customer. For example, link 840 in email message 800 may be a link or URL to a page of web server 600, discussed above. The link may allow a customer to access a web page providing images of an order being processed and may include any of the types of images and/or video clips described herein. Thus, in some embodiments, a network or Internet server device may be configured to provide captured data to customers or other individuals for visual verification of item or order processing. In one embodiment, control system 300 may include such a server, while in other embodiments, a separate server may be utilized, but which may be coupled to control system 300. For instance, control system 300 may automatically store captured data, such as images, related to an order on a web server and may also configure access information, such as user name and password information, on the web server.

In one embodiment, web page 640 may be publicly viewable, while in other embodiments, the customer may have to login and/or provide a password, customer identifier or other code in order to see the images, as described above. For example, in one embodiment, the customer may have to login using pre-existing customer login credentials, such as username and password. Other types of login credentials may also be used, according to different embodiments. In some embodiments, the notification message, or, in some cases a separate message, may include temporary login credentials for use when viewing the captured images. Access to the captured images may be permanent or temporary depending upon the nature of individual embodiments.

In some embodiments, link 840 in email message 800 may direct a customer to an account status page of a merchant's website. Captured images may be available through a customer's account status web page. In one embodiment, a customer may be able to access images for an order without using any link or reference from an electronic notification. Alternatively, in such an embodiment, a customer may determine that an order has been processed and view images of the order being processed via an account status web page. In other embodiments, however, images may only be accessible using information included in an electronic notification, such as email message 800.

Figure 9:
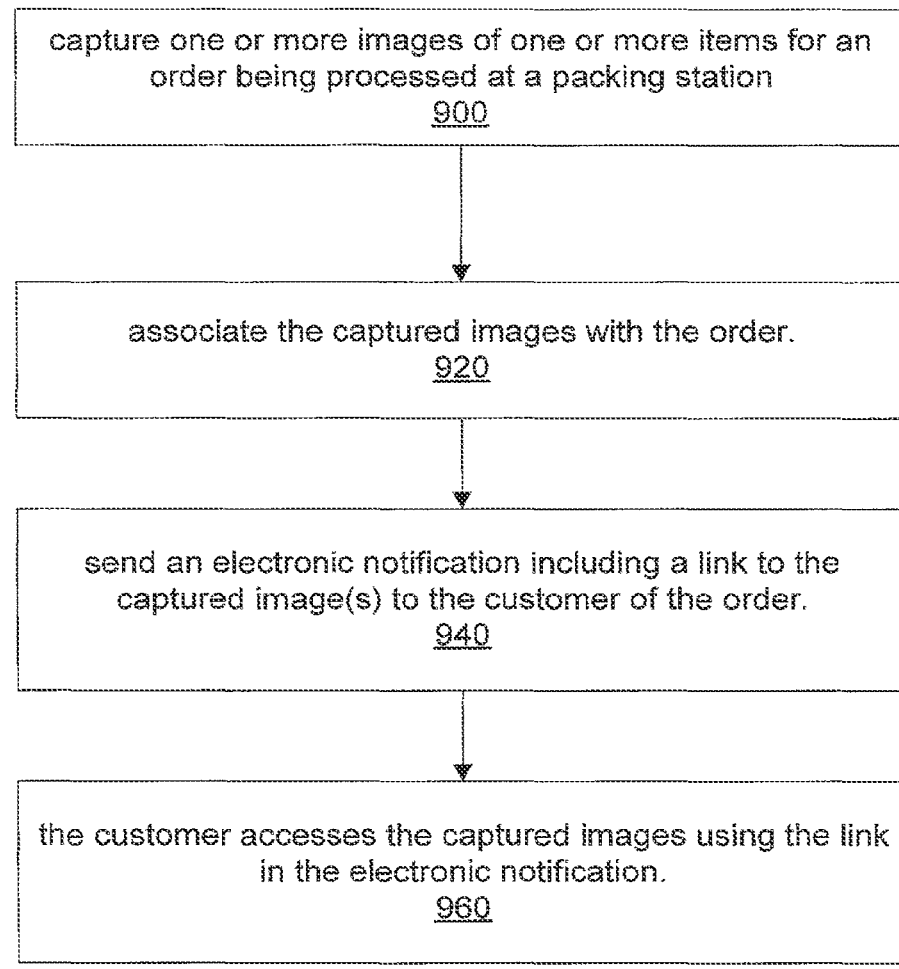
FIG. 9 illustrates one embodiment of a method for sending an electronic notification including captured images of an order.

FIG. 9 illustrates one embodiment of a method for sending an electronic notification including captured images of an order. An order fulfillment center may capture one or more images of one or more items for an order being processed at a packing station, as illustrated by block 900. As described above, images or video may be captured throughout the processing of an order and of the processing of individual items before an order is placed. Thus, various embodiments will implement visual verification of order processing by capturing different aspects of order processing. In one embodiment, only images of the packing and shipping of the order may be included in visual verification notifications. In other embodiments, however, video clips of items being customized, such as with engraving, monograms, etc., may also be included in notifications.

Captured images may be associated with the order being processed, as illustrated by block 920. As images of an order being processed are captured, they may be associated with the order. For example, an order number, or invoice number may be used to index the images, in one embodiment, in another embodiments, the image may be linked to the item's identification number and the item linked to the order. Items may be associated with the order to facilitate retrieval by order. Captured images, video, and audio may be stored in any number of different manners, using any suitable format and structure, according to the implementation of different embodiments.

Additionally, an electronic notification including a link to the captured images may be sent to the customer of the order, as illustrated by block 940. As described above, an electronic notification, such as an email, instant message, cellular picture, or text message may be sent to a customer including one or more links or references to captured images, video, and/or audio clips of that customer's order being processed. For example, the customer may receive an email message including a Universal Resource Locator (URL) to a webpage configured to allow that customer to view captured images of his order being processed.

The customer may then access the captured images using the link in the electronic notification, as illustrated by block 960. For example, a customer may use a web browser program to access the captured images of her order being processed. In some embodiments, the customer may have to login to a specific service in order to view captured images. In one embodiment, the customer may log in using a preexisting customer ID and password through a merchant site. In another embodiment the notification message may have include information, such as a user name and password, usable to access the images, video, and/or audio.

Figure 10:
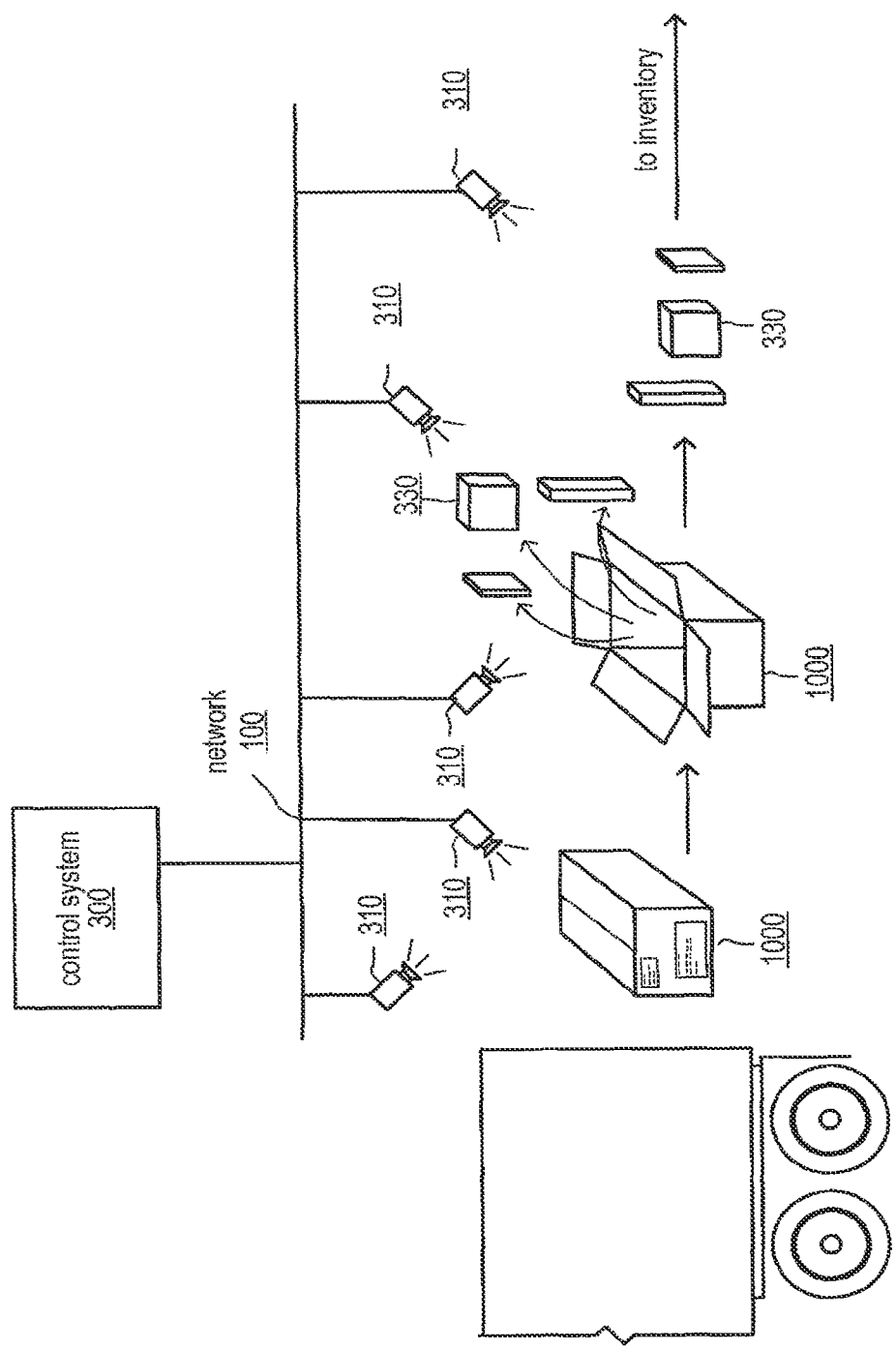
FIG. 10 illustrates capturing images of a package arriving at an order fulfillment center, according to one embodiment.

As opposed to, or in addition to, capturing data for visual verification of order processing, as described above, data may be captured at one or more receiving areas in an order fulfillment center or materials handling facility. For instance, FIG. 10 illustrates capturing of images for a shipment of items arriving at a materials handling facility, according to some embodiments. Captured images of a container arriving at a order fulfillment center or materials handling facility may be reviewed to determine any defects in the container, such as damage to the container or defects related to an item or items in the container. For example, container 1000 may be delivered and one or more image capture devices 310 may capture images of the container being unloaded and unpacked, according to some embodiments. As mentioned above, captured images may include images of items being processed before an order has been placed for the item. For example, images may include one or more images of an item being received, inspected and stocked in inventory, according to one embodiment. Including captured images of items being received, inspected, and/or stocked may provide a customer with confidence that an item has been properly processed through the entire materials processing facility. In some embodiments, captured images of items being unpacked from a shipping container may be reviewed to determine any of various possible defects in the shipment. For example, reviewing captured images may help identify damaged, missing, and/or extra items in a shipment. Additionally, images of a received shipment captured before the shipment has been opened and the contents inspected may be reviewed by buyers or other personnel to gather information about the shipment, such as the size, number of containers, etc., before a detailed inventory of the items received is available, according to certain embodiments.

As with the capturing of images during order processing, capturing images during receiving may be performed by one or more images capture devices 310, according to some embodiments. In other embodiments, however, additional data, such as timing or environmental data may also be captured an associated with received items. For example, one or more motion detectors, electronic eyes, or other detection devices may control the capturing of images. In general, any technique or equipment used to capture data, such as images or video, of order processing, as described herein, may also be applied to capturing images of items being delivered, received, inspected, stocked, and/or inventoried.

Additionally, captured images of items delivered to an order fulfillment center may also help determine and/or correct shipping and/or packing issues. For example, capturing images of delivered items may records the details of damaged shipment that may be reviewed with the shipping company or the shipper, in one embodiment. Image capture devices 310 may also capture images of the unpacking of one or more items 330 from container 1000. Thus, a visual record of the items actually delivered and their state (e.g. perfect, damaged, used, etc) may be viewed in captured images. Additionally, the quality of the packaging may also be captured, including capturing images of the amount, if any, of packing material (dunnage) included in container 1000 as well as any other items in the container. Control system 300 may received the captured images from one or more image capture devices 310.

In some embodiments, images may be captured of orders returned by customers. For example, images may be captured of packages returned by customers before such packages are opened to determine and/or record the manner of package, i.e. was a suitable package used to prevent damage during shipping. Additionally, in some embodiments, images may be captured as returned orders are opened and unpacked to determine and record whether any of the items in the package are damaged and/or missing. Service personnel may review captured images of returned orders to determine whether to partially, or fully, refund customers. According to some embodiments, images captured when the order was originally processed may be located and reviewed as well to help determine the validity of a customer complaint or return.

Capturing images of customer returns may be part of an automated process for reviewing customer returns/complaints. For example, customer service personnel may scan a return-mailing label, or other shipping label, on a customer returned package in order to start reviewing the customer return. The information scanned, or manually input, from the return-mailing label may be used to associate the captured images of the customer return with other documents or information regarding the return. For instance, scanning a return-mailing label may represent the start of session for processing the customer return. Such a session may include the capturing of images of the returned items. Additionally, the information from the return-mailing label may, in one embodiment, be used to initiate the image capture of the processing of the returned items.

In some embodiments, additional textual or graphic information may be added, inserted, or otherwise included in the captured images, such as the date/time the image was captured, an order or shipment identifier, a receiving station identifier, and/or the name(s) of the personnel receiving and unpacking the shipment, among other things. Additionally, in some embodiments, a security certification or digital signature may also be attached to captured images allowing a person receiving the images to verify that the images are indeed from the order fulfillment center.

Figure 11:
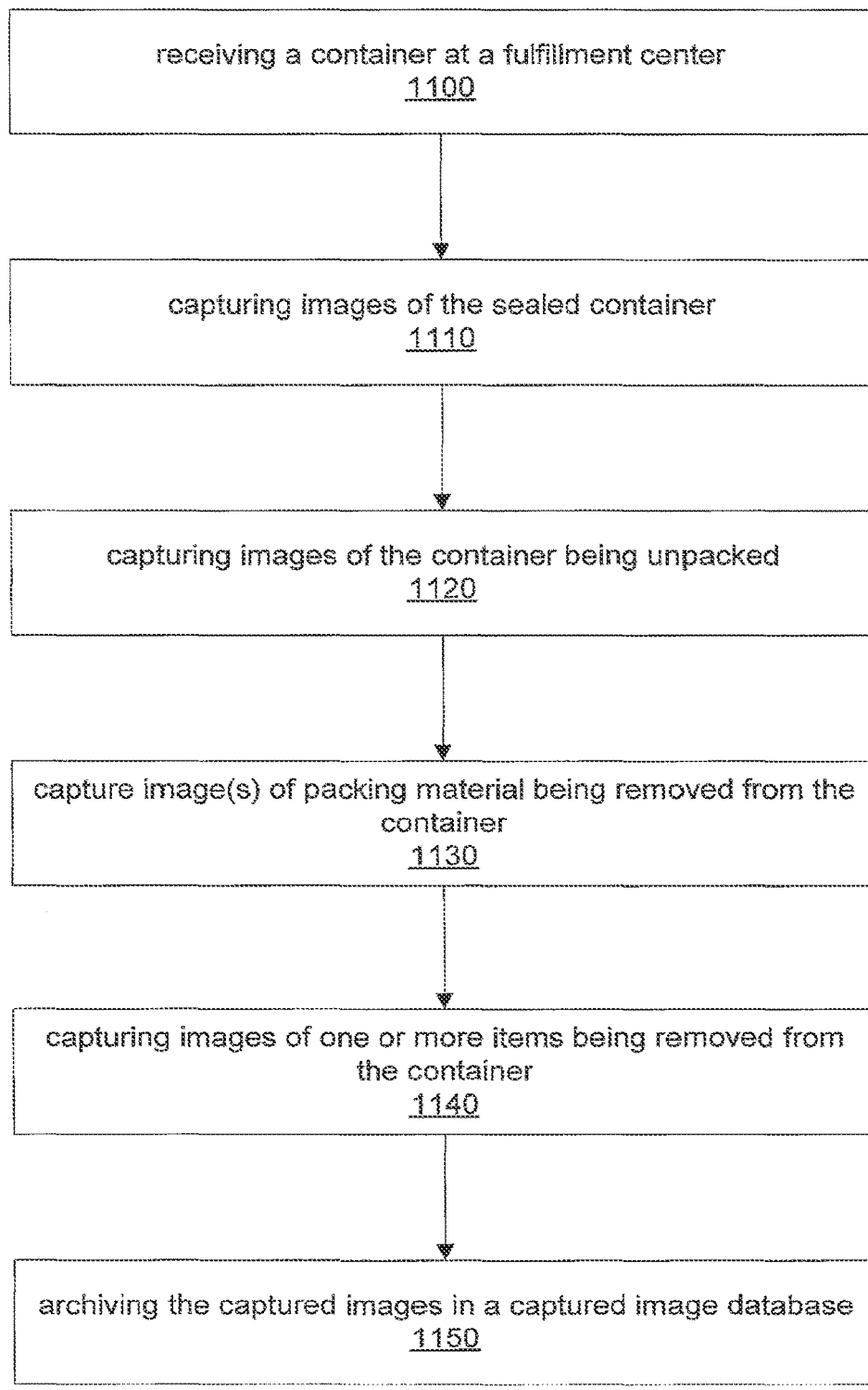
FIG. 11 illustrates one embodiment of a method for capturing images of a received package at an order fulfillment center.

FIG. 11 illustrates one embodiment of a method for capturing images of a received container at a materials handling facility. A container or package may be received at a materials handling facility, as illustrated by block 1100. Images may be captured as shipments of items arrive at the materials handling facility. Images may be captured of the sealed container, as illustrated by block 1110 and also of the container being unpacked, as illustrated by block 1120. In one embodiment, images of the sealed container may be captured that show address label information, such as shipper information, specific return address, shipping method, etc. As the container is being unpacked, the type and quality of packing may be recorded via images. For example, a captured video may show damage to delivery that occurred during shipping or may show poor packing of certain items. Visual verification data may be sent to suppliers and shippers as well as to customer as described above. For example, sending a supplier a video showing that a particular item is routinely damaged during shipping may encourage the supplier to change packing or shipping method.

Images may also be captured of any packing material in the container and of it being removed from the container, as illustrated by block 1130. Such images may be captured automatically, based one or more motion detectors of the unpacking of received shipment by one or more processing agents, in one embodiment. As when capturing images of order processing, image capture may be triggered either manually by processing agents, or automatically by control system 300, according to different embodiments. In some embodiments, a combination of manual and automatic triggering of image capture may be utilized, and whether manual, automatic, or combination of both are used may vary by processing station or by processing task.

As illustrated by block 1140, images may additionally be captured of one or more items being removed from the container. Images may be captured of individual items being unpacked from a shipment. These images may, in some embodiments, be included in images of an order being processed. Additionally, captured images showing the unpacking of individual items may aid in determining that the shipment is complete and correctly packaged. The captured images may then be archived in a captured image database, as illustrated by block 1150. For example, in one embodiment, images captured during receiving may be stored in the same image database as other images described herein. In other embodiments, however, images captured during receiving may be stored in a separate image database.

Figure 12:
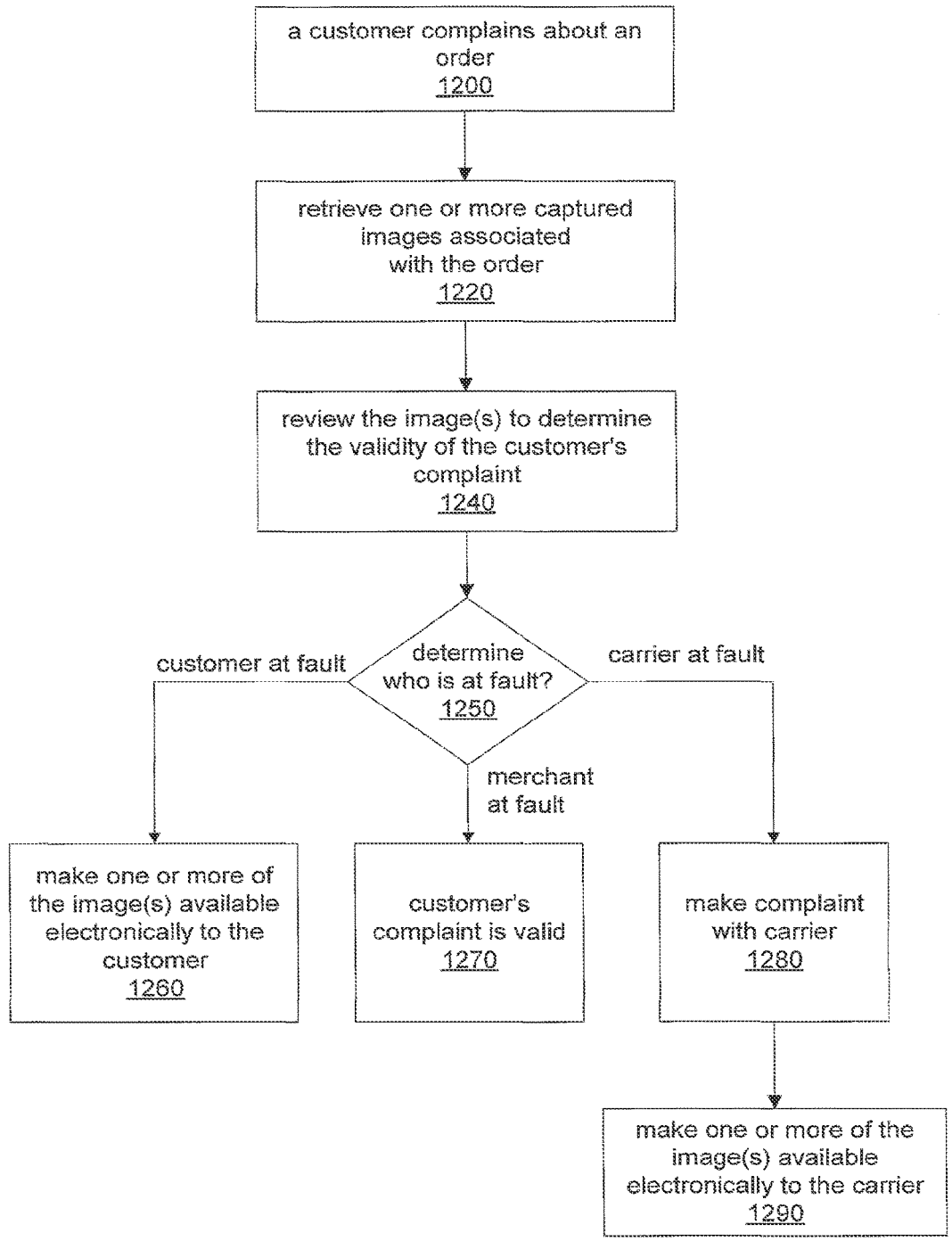
FIG. 12 illustrates one embodiment of a method for using captured images when resolving a customer complaint regarding an order.

FIG. 12 illustrates one embodiment of a method for using captured images when resolving a customer complaint regarding an order. The images captured recording the processing of an order may also be used to determine the validity of a customer complaint. For example, a customer may complain, as illustrated by block 1200, that a particular item was not included in the order. By reviewing the images captured during the processing of that particular order, customer service personnel may be able to determine whether or not that item was included in that order. Thus, verification data captured during item and/or order processing may be used to verify the validity of a customer complaint.

For instance, a customer service representative may retrieve one or more images associated with the order, as illustrated by block 1220, and review the images to determine the validity of the customer's complaint, as illustrated by block 1240. By reviewing one or more images captured during the processing and shipping of the order, customer service representatives may be able to determine whether the order was packaged appropriately for the items being shipped and whether or not the order was intact when loaded onto the delivery vehicle. In some embodiments, evaluating customer complaints based on reviewing captured images of the customer's order may be performed anywhere, at virtually any location in the world, as described above. Thus, visual verification of order processing regarding a customer complaint may allow a customer service representative to determine, as illustrated by decision block 1250, whether the customer, the merchant or order fulfillment center, and/or a shipping carrier was at fault for the problem that caused the customer to complain. Additionally, one or more of the retrieved images may be made available electronically to the customer for review, as illustrated by block 1260. For instance, in one embodiment, a customer service representative may, based on review captured images, determine that the customer was at fault and may make one or more of the captured images available for the customer to review. Captured images may also be sent to a customer no matter what party was at fault for issue that caused the customer complaint, according to some embodiments. In yet other embodiments, captured images regarding a customer complaint may only be made available to the customer if the customer is found to be at fault. Thus, the customer may be able to see for themselves the images that show that the particular item was indeed included in the order.

If the merchant or order fulfillment center is determined to be at fault resulting in a customer complaint, the customer may have a valid complaint, as illustrated by block 1270. The merchant or order fulfillment center may take appropriate action to correct the problem, such as by sending a corrected order to the customer or refunding the customer. If a shipping carrier is found to have caused a problem resulting in a customer complaint, a complaint may be lodged with the shipping carrier, as illustrated by block 1280. Additionally, as illustrated by block 1290, one or more of the images may be made available electronically to the carrier, according to some embodiments. For example, in one embodiment, a customer service representative, after determining that a shipping company causes damage to a customer order, may inform the carrier of the problem and send, such as via email, one or more images illustrated the order being processed and packaged for shipment.

Captured images regarding a customer complaint may be made electronically available for the customer, shipping carrier, or others to review in any of the manners described above regarding making images of order processing available. For instance, in one embodiment captured image may be sent via email to the customer. Alternatively, in another embodiment, captured images may be stored on a web server to which the customer is given access. In another embodiment, a customer may be referred to captured images already sent to the customer as part of notifying the customer that an order was processed and/or shipped.

Additionally, using captured images to resolve customer complaints may also prevent repetition of the original shipping problem when the order is shipped a second time. For example, an incorrect item may be shipped to a customer due to a cataloging, inventory, or other problem that causes an order-processing agent to believe that the correct item was shipped. In such a situation, the same error, if not corrected, may cause the incorrect item to again be shipped after a customer complaint when the order fulfillment centers attempts to ship the customer the correct item. Reviewing captured images of the processing of the original order may allow such a problem to be identified and corrected before an incorrect item is shipped a second time, according to one embodiment.

In some embodiments, an order fulfillment center may provide an automated system allowing customers to review captured images of their order being processed before returning the order or reporting a complaint regarding the order. For example, in one embodiment, a web server may store captured images, or other collected data, regarding a customer order and the customer may be able to log in to access the images. In another embodiment, the customer may access an automated customer complaint system, such as provided over the Internet via a web server, and may review images capturing during the processing of their order as part of reporting a customer complaint about the order. For example, a customer may be asked to indicate one or more images that illustrate an error in processing their order. Such an automated customer complaint system may also allow a customer to perform various functions related to captured verification data, such as downloading captured images, requesting additional verification data, submitting complaint details with reference to captured data, or communicating with customer representatives, perhaps in real time.

Figure 13:
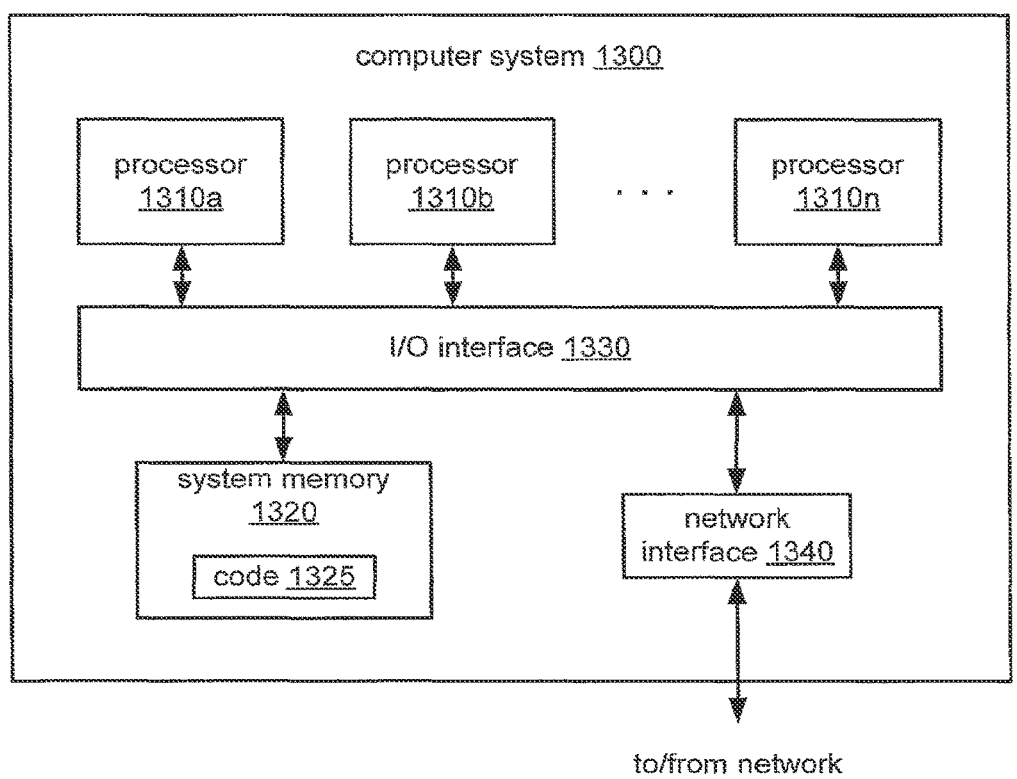
FIG. 13 is a block diagram illustrating an exemplary embodiment of a computer system suitable for implementing visual verification of order processing as described herein.

FIG. 13 is a block diagram illustrating an embodiment of a computer system usable to implement visual verification of order processing. In one embodiment, an order fulfillment control system, such as control system 300, illustrated in FIG. 3A, may include a general-purpose computer system that includes or is configured to access one or more computer-accessible media, such as computer system 1300 illustrated in FIG. 13. In some embodiments, an order fulfillment facility may also include various communication devices, described above, that each may include a general-purpose computer system, such as computer system 1300. In yet other embodiments, an order fulfillment center may also include a web server, as described herein, that may be implemented on one or more general-purpose computers, such as computer system 1300. Additionally, an order fulfillment center may include a notification system, either separately or as part of a control system 300 as described herein, which may also be implemented on one or more general-purpose computer systems, such as computer system 1300.

In the illustrated embodiment, computer system 1300 may include one or more processors 1310 coupled to a system memory 1320 via an input/output (I/O) interface 1330. Computer system 1300 further includes a network interface 1340 coupled to I/O interface 1330. In some embodiments, computer system 1300 may be illustrative of control system 300, while in other embodiments control system 300 may include elements in addition to computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 1320 may be configured to store instructions and data accessible by process 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an order fulfillment control system, are shown stored within system memory 1320 as code 1325.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, for example. In particular, network interface 1340 may be configured to allow communication between computer system 1300 and the various image capture devices 310, or control system 300, via network 100, described above. Network interface 1340 may commonly support one or more wireless networking protocols (e.g., Wi-Fi/IEEE 802.11, or another wireless networking standard). However, in various embodiments, network interface 1340 may support communication via any suitable wired or wireless general data networks, such as other types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1300 via I/O interface 1330. A computer-accessible medium may also include any volatile or non-volatile media such as RAM (e.g. SDRAM, DDR SDRAM, RDRAM, SRAM, etc.), ROM, etc, that may be included in some embodiments of computer system 1300 as system memory 1320 or another type of memory. Further, a computer-accessible medium may include transmission media or signals such as electrical, electromagnetic, or digital signals, conveyed via a communication medium such as network 100, another network, and/or a wireless link, such as may be implemented via network interface 1340.

Network 100, as illustrated in FIG. 2, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments.

In one embodiment, the relationship between a control system 300 and image capture devices 310 may be a server/client type of relationship. For example, control system 300 may be configured as a server computer system 1300 that may convey instructions to and receive acknowledgements from image capture devices 310. In such an embodiment, image capture devices 310 may be relatively simple or "thin" client devices. However, in some embodiments, image capture devices 310 may be computer systems configured similarly to computer system 1300, including one or more processors 1310 and various other devices (though in some embodiments, a computer system 1300 implementing a image capture devices 310 may have somewhat different devices, or different classes of devices, compared to a computer system 1300 implementing control system 300). It is further contemplated that in some embodiments, the functionality of control system 300 may be distributed across some or all of image capture devices 310.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
one or more servers configured to:
obtain one or more images of one or more items indicated in a customer order, wherein the one or more images are of the items being processed for the order;
transmit the one or more images of the one or more items to a customer device;
receive a request from the customer to perform an action pertaining to the customer order, wherein the request from the customer is based at least in part on the one or more images transmitted to the customer device, and wherein the action comprises at least one of:
    retrieve one or more captured images of the customer order to verify absence of an item from the order, or
    transmit additional verification data for the customer order to the customer device; and
based at least in part on receipt of the request to perform the action, initiate the requested action pertaining to the customer order.

2. The system of claim 1, wherein the request comprises a request to download the one or more images or a message associated with the one or more images.

3. The system of claim 1, wherein at least one of the one or more images comprises an image of a plurality of items from the customer order.

4. The system of claim 1, wherein the one or more servers are further configured to receive, from the customer device, an indication of at least one of the one or more images that illustrate an error in processing the customer order.

5. The system of claim 1, wherein the one or more servers are further configured to receive, from the customer device, complaint details associated with the customer order.

6. The system of claim 1, wherein the one or more servers are further configured to make at least one of the one or more images available to a device used by a customer service representative.

7. The system of claim 1, wherein the one or more servers are further configured to provide the customer with communication with a customer service representative.

8. The system of claim 1, further comprising one or more image capture devices configured to capture the one or more images of the one or more items, wherein the one or more images comprise an image of an item of the order in a stage of order processing as the order processing is performed at a materials handling facility, the stage comprising inventory receiving, inventory stowing, picking, sorting, packing, value-added services, shipping, return processing, or quality control.

9. A method, comprising:
performing, by one or more computing devices comprising a processor:
    obtaining one or more images of one or more items indicated in an order from a customer, wherein the one or more images are of the items being processed for the order;
    transmitting the one or more images of the one or more items to a customer device;
    receiving a request based at least in part on the one or more images, from the customer, to perform an action pertaining to the customer order, wherein the action comprises at least one of:
        retrieving one or more captured images of the customer order to verify absence of an item from the order, or
        transmitting additional verification data for the customer order to the customer device; and
    initiating, based at least in part on receipt of the request to perform the action, the requested action pertaining to the customer order.

10. The method as recited in claim 9, wherein the request comprises a request for downloading the one or more images, or a message associated with the one or more images.

11. The method as recited in claim 9, wherein at least one of the one or more images comprise an image of a plurality of items from the customer's order.

12. The method as recited in claim 9, the method further comprising:
    receiving, from the customer device, an indication of at least one image of the one or more images, the at least one image illustrating an error in processing the order.

13. The method as recited in claim 12, the method further comprising:
    receiving, from the customer device, complaint details associated with the customer order.

14. The method as recited in claim 9, the method further comprising:
    providing the customer with communication with a customer service representative.

15. A non-transitory computer readable medium storing program instructions that when executed by one or more computer processors implement a control system configured to:
    obtain one or more images of one or more items indicated in a customer order, wherein the one or more images are of the items being processed for the order;
    transmit the one or more images of the one or more items to a customer device;
    receive a request based at least in part on the one or more images, from the customer, to perform an action pertaining to the customer order, wherein the action comprises at least one of:
        retrieve one or more captured images of the customer order to verify absence of an item from the order, or
        transmit additional verification data for the customer order to the customer device; and
    initiate, based at least in part on receipt of the request to perform the action pertaining to the customer order, the requested action pertaining to the customer order.

16. The non-transitory computer readable medium of claim 15, wherein the request comprises a request to download the one or more images of the one or more items to the customer device, or a message associated with the one or more images.

17. The non-transitory computer readable medium of claim 15, wherein the one or more images of the one or more items ordered by the customer comprise an image of a plurality of items of the customer's order.

18. The non-transitory computer readable medium of claim 15, wherein the control system is further configured to:
    receive, from the customer device, an indication of the one or more images, wherein the one or more images illustrate an error in processing the order.

19. The non-transitory computer readable medium of claim 18, wherein the control system is further configured to receive, from the customer device, complaint details associated with the customer order.

20. The non-transitory computer readable medium of claim 15, wherein the one or more images of the one or more items comprise an image of an item of the order in a stage of order processing as the order processing is performed, the stage of order processing comprising receiving, stowing, picking, sorting, packing, value-added services, shipping, return processing, quality assurance, or quality control.

* * * * *